US010855656B2

(12) United States Patent
Ashley et al.

(10) Patent No.: US 10,855,656 B2
(45) Date of Patent: Dec. 1, 2020

(54) FINE-GRAINED FIREWALL POLICY ENFORCEMENT USING SESSION APP ID AND ENDPOINT PROCESS ID CORRELATION

(71) Applicant: Palo Alto Networks, Inc., Santa Clara, CA (US)

(72) Inventors: Robert Earle Ashley, Santa Clara, CA (US); Ho Yu Lam, Santa Clara, CA (US); Robert Tesh, Morgan Hill, CA (US); Xuanyu Jin, San Jose, CA (US); Paul Theodore Mathison, San Jose, CA (US); Qiuming Li, San Jose, CA (US); Taylor Ettema, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 159 days.

(21) Appl. No.: 15/705,512

(22) Filed: Sep. 15, 2017

(65) Prior Publication Data

US 2019/0089677 A1    Mar. 21, 2019

(51) Int. Cl.
*H04L 29/06*    (2006.01)

(52) U.S. Cl.
CPC ...... *H04L 63/0236* (2013.01); *H04L 63/0263* (2013.01); *H04L 63/0876* (2013.01); *H04L 63/102* (2013.01); *H04L 63/1425* (2013.01)

(58) Field of Classification Search
CPC .................................................... H04L 63/236
USPC .......................................................... 726/11
See application file for complete search history.

(56) References Cited

U.S. PATENT DOCUMENTS

| 6,772,332 | B1 | 8/2004 | Boebert |
| 7,089,592 | B2 | 8/2006 | Adjaoute |
| 7,386,889 | B2 | 6/2008 | Shay |
| 7,747,730 | B1 | 6/2010 | Harlow |

(Continued)

FOREIGN PATENT DOCUMENTS

WO    WO-2014138115    9/2014

OTHER PUBLICATIONS

Author Unknown, Malware Traffic Analysis, https://blog.brillantit.com/, CryptoWall 3.0 Traffic Analysis, Oct. 29, 2015.

(Continued)

*Primary Examiner* — Jacob Lipman
(74) *Attorney, Agent, or Firm* — Van Pelt, Yi & James LLP

(57) ABSTRACT

Techniques for fine-grained firewall policy enforcement using session APP ID and endpoint process ID correlation are disclosed. In some embodiments, a system/process/computer program product for fine-grained firewall policy enforcement using session APP ID and endpoint process ID correlation includes receiving, at a network device on an enterprise network, process identification (ID) information from an endpoint (EP) agent executed on an EP device, in which the process identification information identifies a process that is initiating a network session from the EP device on the enterprise network; monitoring network communications associated with the network session at the network device to identify an application identification (APP ID) for the network session; and performing an action based on a security policy using the process ID information and the APP ID.

18 Claims, 10 Drawing Sheets

(56) References Cited

U.S. PATENT DOCUMENTS

| | | | |
|---|---|---|---|
| 7,801,518 B1 | 9/2010 | Urbanek | |
| 7,930,746 B1 | 4/2011 | Sheleheda | |
| 7,958,228 B2 | 6/2011 | Riise | |
| 8,131,851 B2 | 3/2012 | Harlow | |
| 8,365,276 B1 * | 1/2013 | Sallam | G06F 21/552 713/189 |
| 8,418,249 B1 * | 4/2013 | Nucci | G06F 21/552 706/20 |
| 9,043,905 B1 | 5/2015 | Allen | |
| 9,348,985 B2 | 5/2016 | Davis | |
| 9,648,035 B2 | 5/2017 | Basavapatna | |
| 10,572,823 B1 * | 2/2020 | Feinman | G06F 21/56 |
| 2002/0087882 A1 | 7/2002 | Schneier | |
| 2007/0058551 A1 | 3/2007 | Brusotti | |
| 2007/0192865 A1 | 8/2007 | MacKin | |
| 2007/0195753 A1 | 8/2007 | Judge | |
| 2007/0199061 A1 | 8/2007 | Byres | |
| 2007/0206741 A1 | 9/2007 | Tiliks | |
| 2007/0294369 A1 | 12/2007 | Ginter et al. | |
| 2008/0047009 A1 | 2/2008 | Overcash | |
| 2008/0175226 A1 | 7/2008 | Alperovitch | |
| 2009/0178139 A1 | 7/2009 | Stute | |
| 2010/0192225 A1 * | 7/2010 | Ma | G06F 21/552 726/23 |
| 2011/0238979 A1 | 9/2011 | Harp | |
| 2013/0019314 A1 * | 1/2013 | Ji | H04L 67/02 726/25 |
| 2013/0083701 A1 * | 4/2013 | Tomic | H04L 12/462 370/255 |
| 2013/0291099 A1 | 10/2013 | Donfried | |
| 2013/0298244 A1 | 11/2013 | Kumar | |
| 2015/0103136 A1 | 4/2015 | Anderson | |
| 2015/0288709 A1 | 10/2015 | Singhal | |
| 2016/0142435 A1 | 5/2016 | Bernstein | |
| 2016/0164893 A1 | 6/2016 | Levi | |
| 2016/0191563 A1 | 6/2016 | Beauchesne | |
| 2016/0359889 A1 | 12/2016 | Yadav | |
| 2017/0103215 A1 | 4/2017 | Mahaffey | |
| 2017/0163666 A1 * | 6/2017 | Venkatramani | H04L 63/0272 |
| 2017/0237762 A1 | 8/2017 | Ogawa | |
| 2017/0279819 A1 | 9/2017 | More | |
| 2019/0081983 A1 * | 3/2019 | Teal | G06F 21/54 |

OTHER PUBLICATIONS

Author Unknown, Threat Analytics Platform, Gurducul Predictive Security Analytics, downloaded from gurucul.com_wp-content_uploads_2015_04_TAP on May 20, 2015.

Cappelli et al., Common Sense Guide to Prevention and Detection of Insider Threats, 3rd Edition, Version 3.1, CyLab, Jan. 2009.

Dan Cybulski, Palo Alto Networks Uses Neural Networks to Attack Insider Threat, Apr. 9, 2015.

Darren Manners, The User Agent Field: Analyzing and Detecting the Abnormal or Malicious in your Organization, published Oct. 20, 2011, retrieved From https://www.sans.org/reading-room/whitepapers/malicious/user-agent-field-analyzing-detecting-abnormal-malicious-organization-33874.

Freiling et al., Botnet tracking: Exploring a Root-Cause Methodology to Prevent Distributed Denial-of-Service Attacks, Retrieved from http://link.springer.com/chapter/10.1007%2F11555827_19, European Symposium on Research in Computer Security. Springer Berlin Heidelberg, 2005.

Greitzer et al., Predictive Modeling for Insider Threat Mitigation, Pacific Northwest National Laboratory, Apr. 2009.

Microsoft, Security Monitoring and Attack Detection, Microsoft MSDN Library, published Aug. 29, 2006, Retrieved From https://msdn.microsoft.com/en-us/library/cc875806.aspx.

Schnackengerg et al., Cooperative Intrusion Traceback and Response Architecture (CITRA), Retrieved from http://ieeexplore.ieee.org/stamp/stamp.jsp?arnumber=932192, DARPA Information Survivability Conference & Exposition II, 2001. DISCEX'01. Proceedings. vol. 1. IEEE, 2001.

Silowash et al., Insider Threat Control: Understanding Data Loss Prevention (DLP) and Detection by Correlating Events from Multiple Sources, Software Engineering Institute, Carnegie Mellon, Jan. 2013.

Stiawan et al, Characterizing Network Intrusion Prevention System, International Journal of Computer Applications, vol. 14, Jan. 2011.

Tim Treat, What We Learn From Protecting Artificially Intelligent Cars, Palo Alto Networks, Sep. 5, 2014.

Warkentin et al., Behavioral and Policy Issues in Information Systems Security: The Insider Threat, European Journal of Information Systems, Apr. 2009.

* cited by examiner

FINE-GRAINED FIREWALL POLICY ENFORCEMENT USING SESSION APP ID AND ENDPOINT PROCESS ID CORRELATION

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, tablets, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
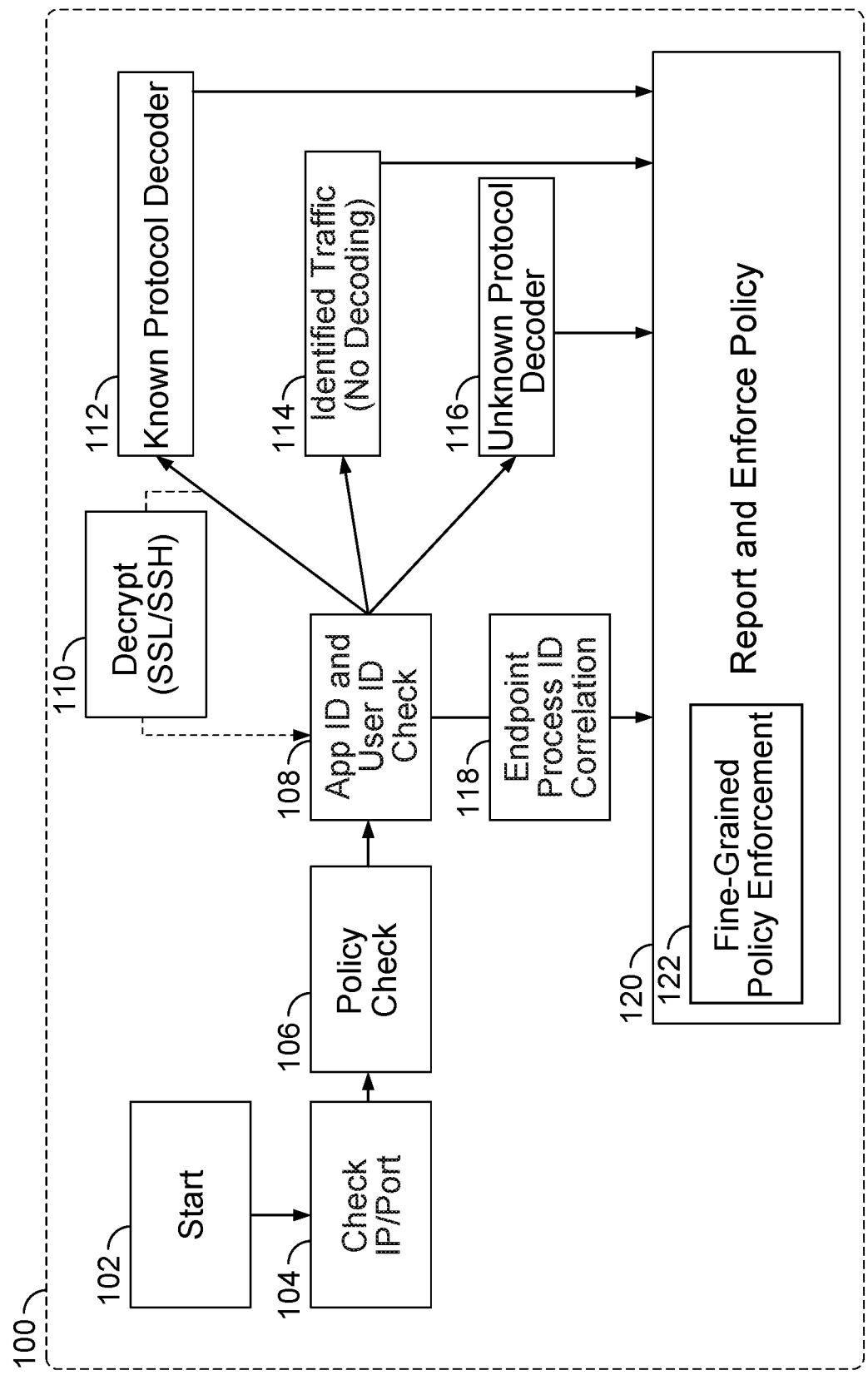
FIG. 1 is a diagram of an architecture of a network device that can be used for providing fine-grained policy enforcement and/or outbound/inbound lateral traffic punting based upon process risk in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, tablets, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., security policies, which can also include network policies and/or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify, log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA-Series firewalls, and Palo Alto Networks' VM-Series firewalls which are a virtualized form factor of their next-generation firewall that can be deployed in a range of public and private cloud computing environments based on technologies from various vendors, including VMware®, Amazon® Web Services, Microsoft®, Citrix®, and KVM). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls can be implemented, for example, as dedicated appliances which can generally provide higher performance levels for application inspection than software executed on general purpose hardware (e.g., such as the above-mentioned PA-Series firewalls implemented on security appliances provided by Palo Alto Networks, Inc., which utilize, for example, dedicated, function specific processing that is tightly integrated with a single-pass software engine to maximize network throughput while minimizing latency).

Overview of Techniques for Fine-Grained Firewall Policy Enforcement Using Session APP ID and Endpoint Process ID Correlation While existing advanced or next generation firewalls generally can perform stateless and stateful packet filtering and application layer filtering as discussed above, an enterprise (e.g., Information Technology (IT), network, and/or security administrator (admin) for the enterprise) may desire to implement more fine-grained security policies. Specifically, existing advanced or next generation firewalls generally lack process/application information executed on an endpoint (EP) device that is associated with inspected network traffic at the network device (e.g., a network device, such as an appliance, server, or other network device) implementing the firewall.

Thus, what are needed are new and improved techniques for fine-grained firewall policy enforcement using session application identification (e.g., APP ID) and EP process identification (e.g., ID) correlation. Accordingly, techniques for fine-grained firewall policy enforcement (e.g., security/firewall policy enforcement at the network device) using session APP ID and endpoint process ID correlation are disclosed. In some embodiments, new and improved techniques are disclosed to facilitate collection and correlation of EP process/application information at the network device (e.g., a network device, such as an appliance, server, or other network device) implementing the firewall to implement fine-grained firewall policy enforcement using session APP ID and EP process ID correlation.

As an example, an enterprise may want to configure a security policy that can restrict network traffic associated with a particular APP-ID to certain authorized processes or authorized applications based on the security policy (e.g., specific processes/applications that are certified or trusted by the enterprise based on the security policy). As another example, the enterprise may want to configure a security policy that can restrict network traffic access to certain resources, such as an Active Directory (AD) server and/or a file server, on the enterprise network to authorized processes (e.g., authorized applications) based on the security policy (e.g., including a rule(s) in the security policy for Microsoft Windows® authentication and file share system processes, which would not allow other processes/applications access to the AD server or file server on the enterprise network, such that a JavaScript interpreter associated with the WScript.exe executable file would not be allowed access to the AD server or file server on the enterprise network).

Accordingly, by correlating a network session with process information (e.g., process ID information) from the endpoint, the firewall can provide a more fine-grained control for security policy enforcement at the firewall. For example, the disclosed techniques can be applied to more effectively restrict attack vectors and evasions (e.g., malware attempts to evade firewall/security detection), and/or to detect rootkits. As another example, the disclosed techniques can be applied to provide additional and relevant telemetry information for security analysis.

Various examples of evasions that can be detected using the disclosed techniques will now be described. As an example, applications can modify traffic to spoof or disguise as a whitelisted session application identification (e.g., APP ID), matching to an allowed policy (e.g., matching to a permissible/allowed activity in a firewall/security policy). As another example, applications can use protocols that the firewall would not have any way to differentiate from more trustworthy applications (e.g., command and control (C&C) malware can communicate using permissible/allowed protocols, such as over DNS and/or HTTP protocols).

In some cases, a network session may be identified by a firewall as unknown TCP/UDP/SSL traffic. By applying the disclosed techniques for correlating a network session with process information (e.g., process ID information) from the endpoint, the firewall can associate the process executed on the endpoint with the network session that was identified as unknown TCP/UDP/SSL traffic (e.g., informing an administrator as to what is causing the network session and/or applying a firewall/security policy based on this associated/additional endpoint process information).

In some cases, an initial run, zero day malicious application may be allowed to execute until a security/firewall vendor or security service provider determines (e.g., determines a verdict) whether the application is malicious/malware. By applying the disclosed techniques for correlating a network session with process information from the endpoint, the firewall can associate the process executed on the endpoint with the network session that was initiated by the initial run, zero day malicious application, and the firewall can be configured with a security policy to deny outgoing traffic associated with the application until a verdict is given.

In some cases, an application may be created to execute a hidden routine (e.g., a backdoor) under circumstances that were not detected by a security/firewall vendor or security service provider during malware sample emulation testing. As further discussed below, in the disclosed techniques for correlating a network session with process information (e.g., process ID information) from the endpoint, the firewall can facilitate identifying such risky/rogue sessions (e.g., and such additional information can be utilized to enhance/improve or correct previous verdicts based on malware sample emulation testing that did not trigger the hidden routine/backdoor execution).

In some cases, advanced stealth malware such as a rootkit may be able to access the network while bypassing endpoint protection systems. With the disclosed techniques, the absence of a valid process ID association for a network session is an abnormality that a firewall can use to detect and block such traffic.

Process ID Information and Hierarchical Process IDs

In some embodiments, the disclosed techniques for correlating a network session with process information from the endpoint includes the following: a trusted agent executed on one or more endpoints in the enterprise network environment, a network device/firewall that can identify an APP ID associated with a network session in the enterprise network environment, and a policy (e.g., a fine-grained security policy) that is used to configure the firewall to perform security policy enforcement based on network session (APP ID) and process ID information. For example, a trusted agent (e.g., EP agent) is executed on an EP device (e.g., a TRAPS agent or GlobalProtect (GP) client, which are commercially available EP agent solutions from Palo Alto Networks, Inc.) that identifies a process that is initiating a network session and notifies the firewall of the process information associated with the network session (e.g., based on an EP security policy). In an example implementation, the process IDs can be provided using hierarchical process IDs (e.g., the process top level hierarchal grouping data can be gathered from alternativeto.net or another commercially or publicly available resource) as further described below.

Collecting and Communicating Endpoint Process Information to the Firewall

In some embodiments, process ID information is received from an agent (e.g., host agent) at and processed on a network device implementing a firewall. For example, an agent (e.g., host/EP agent or other software component) executed on an endpoint (EP) can send process ID information to the firewall for each session or selected sessions (e.g., process ID information can indicate that it is a known process, unknown process, or known but unexpected process, such as in the case of a policy based on a web browser example in which the policy allows the web browser for HTTP/other network protocols but is limited to the Microsoft Internet Explorer® (IE) web browser, and will only allow another browser, such as Google Chrome®, to access a particular internal server on the enterprise network in this example firewall/EP security policy).

In an example implementation, using an EP agent, packet headers (TCP Options) can be modified to provide additional information to facilitate greater collaboration and/or coordination between EP agents and a network device (e.g., firewall). For example, secure communications between the EP agents and the firewall can be performed with authentication, using packet tagging, such as using TCP Options in the packet headers, which can be secured using digital signatures (e.g., hash/digest on a 5-tuple of a TCP packet and then signed using PKI asymmetric public/private keys, which can be performed periodically), using authenticated cookies (e.g., symmetric key, pseudo random sequence of numbers that are predetermined by pre-shared keys, which can be used more frequently with a less expensive processing impact on EPs), or using a combination of both of these techniques (e.g., using PKI mechanism to periodically exchange pre-shared keys between firewall and client) and/or other techniques can be performed to facilitate secure communications between the EP agents and the firewall.

For example, agents (e.g., EP agents) can be executed on each of the internal devices including servers, appliances, end user devices, and/or other EP devices on a subnet protected by the firewall that can monitor traffic and (securely) communicate with (e.g., query and/or receive from) the agents to obtain process ID information. The firewall can correlate network session related information monitored by the firewall (e.g., APP ID and (optionally) other information, such as user ID, content ID, etc.) with process ID information. The firewall can then implement a fine-grained security policy based on APP ID and process ID information (e.g., in an example security policy, Microsoft Active Server/authentication server may only be permitted to perform authentication for Microsoft system services, which can be whitelisted in this example security policy).

In one embodiment, the process ID information is stored as a digest of the file name of the binary/executable associated with the process that initiated the network session (e.g., using a hash function, such as MD5, SHA-2, or another hash function performed by the agent on the EP). For example, the process ID information collected and stored by the agents can be communicated to the firewall by sending process ID information in-band (e.g., using SYN packet marking via TCP Options or other protocols/techniques can be implemented) or out-of-band (e.g., using a separate secure connection between the EP device and the firewall, which can be performed to signal (in advance) to set-up such authentication mechanisms between the agent and the firewall), or a combination of both in-band and out-of-band communication techniques can be implemented depending on EP/firewall resources, network bandwidth, and/or other considerations.

In this example, the firewall can utilize the process ID information to apply a fine-grained security policy. For instance, the firewall can apply a fine-grained security policy that determines whether a process executed on an EP is allowed to access a certain resource on the enterprise network, in which a match operation on the digest can be performed to identify if the process is benign/known, malicious, or unknown, and whether for benign/known process matches that such processes may be allowed to access the resource being protected by the firewall. The process ID information can also be utilized to query for further information from a commercially available security service, such as the WildFire™ cloud-based malware analysis environment provided by Palo Alto Networks® (e.g., to request a verdict/status for the process, such as whether the process is known: benign, malware; or unknown: pending, never seen) and/or the AutoFocus™ contextual threat intelligence service provided by Palo Alto Networks® (e.g., to accelerate analysis, correlation and prevention workflows, which can facilitate security detection/response to, for example, unique, targeted attacks which are automatically prioritized with full context, allowing security teams to respond to critical attacks faster, without additional IT security resources).

In an example implementation, secure communication channels can be used for both control and data channels between the firewall and agents executed on the EP devices using packet marking, tunneling, or a combination of both as similarly described above. Example agent(s) that can be utilized for performing the disclosed techniques include commercially available agent solutions, such as the Traps™ agent solution provided by Palo Alto Networks® or another commercially available agent solution that is capable of monitoring process activity on EP devices (e.g., performing runtime digests of processes executed on EP devices). As further described below, the disclosed techniques facilitate more granular security solutions that can be based on combinations of process ID information and APP ID (e.g., a security policy can restrict internal network device (lateral movement) with a local IP address from performing certain actions within the enterprise/protected network, which can prevent a user from unauthorized access of a resource on the enterprise/protected network and/or prevent a malware process executing on a local EP from unauthorized access of a resource on the enterprise/protected network).

In an example implementation, an agent executed on an EP (e.g., EP device) performs process monitoring of other processes executed locally on the EP. The agent stores or caches the monitored process information. The process monitoring can be performed based on an EP security policy implemented by the agent. For instance, the agent can cache a process ID for each monitored process executed on the EP (e.g., a digest for the application executing the monitored process, such as a hashed version of a web browser application or another application and a digest name such as "Chrome") and/or other information (e.g., other information can include APP ID such as web browsing, protocol, destination, source, or any other attributes monitored by the agent, firewall, and/or security service). An example policy (e.g., EP security policy) that can be implemented by the agent for security enforcement on the EP can include a policy/rule that if the process ID is associated with a web browser application then that process can only perform web browsing (e.g., APP ID is associated with web browsing, such as the HyperText Transfer Protocol (HTTP)) and is not allowed to perform other network protocols (e.g., File Transfer Protocol (FTP) or other protocol(s), which can block malware extensions from executing on the EP via the web browser application, or remote arbitrary code exploits that cause an otherwise benign application to run malicious code that sends unexpected/malicious traffic).

Fine-Grained Policy Enforcement Based on Process ID Information and APP ID

The process ID information can be used for more granular policy controls. In some embodiments, process ID information can be applied to facilitate fine-grained security policy enforcement using a network device/firewall that communicates with agents executed on EP devices in the protected network.

For example, if the APP ID for the Server Message Block (SMB) protocol is whitelisted for backup applications, instead of a security policy allowing any client device in the enterprise network to connect to a backup server in the enterprise network using the SMB protocol, a fine-grained security policy may further specify that only SMB traffic from an enterprise authorized backup application executed on a client device in the enterprise network is allowed. In this example, a ransomware application would be blocked from using the SMB protocol to encrypt files on the backup server in the enterprise network. As another example, the absence of process information for a session originating from a TRAPS/GP-protected EP could indicate a compromised host (e.g., a rootkit may be present and sending traffic).

As another example, a match based on process ID information can be performed at the network device firewall to determine whether process ID information is an unknown process and/or a malware process, and a policy can be applied to block unknown processes and/or a malware process (e.g., a digest for the process does not match a known, trusted executable/application and/or does match previously identified malware executable) from access to protected resources on the enterprise network. In this example, Trojanware (e.g., previously identified Trojanware or new, not yet identified Trojanware) can be blocked from attempting to modify passwords for user accounts on protected resources.

As yet another example, the firewall can implement a fine-grained security policy to flag sessions from untrusted processes for restricted access and/or for further inspection and/or monitoring. For instance, a network session associated with an unknown process or session from Eps (e.g., EP devices) without a trusted agent installed (e.g., an Internet of Things (IoT) device or guest device on the enterprise network) may be blocked from accessing sensitive servers and flagged for extended inspections such as decrypt, deep packet inspection (DPI) (e.g., including layers 3, 4, and/or 7, such as signature matching and/or heuristics based on network monitoring), logging can be performed for the network session, and/or other enhanced security monitoring, prevention, and restriction techniques can be applied to the network session. As such, this helps to identify higher risk traffic on the enterprise network and imposes a more fine-grained and, in some cases, more restrictive policy without affecting normal, trusted traffic on the enterprise network.

Hierarchical Process Groupings by Application Types Using Hierarchical Process IDs In some embodiments, hierarchal process groupings by application types are provided using hierarchical process IDs. For example, hierarchal process groupings by application types can make choosing what processes are allowed and disallowed easier to manage for network/security/IT administrators (e.g., similar to how URL filtering categories are typically implemented and managed). In an example implementation, a hierarchical process grouping can be provided for web browsers (e.g., which can include commercially available web browsers such as Apple Safari, Google Chrome, and Microsoft IE web browsers). As such, network/security/IT administrators would not have to specify each of these web browsers and/or versions to facilitate dynamic policy management of endpoint applications in security policies. These process groupings can be manually created and/or crowd sourced (e.g., using crowd sourced applications and alternatives information, such as provided by alternativeto.net) to facilitate various hierarchal process groupings by application types. For example, an authoritative set of APP IDs associated with each process can be used by network/security/IT administrators to streamline configuration of their policy, via default profiles or policies supplied by a security/threat research subscription (e.g., such as available from Palo Alto Networks, Inc., such as WildFire™ and/or AutoFocus™), a commercially available managed security service, or meta actions such as "allow process ID associated with specific trusted APP IDs." As such, the disclosed techniques facilitate the ability to provide an automated, managed, and up-to-date security policy based on process ID information, without the need for administrators to periodically update their configuration or policy.

In an example implementation, network/security/IT administrators can dynamically add/remove digests to hierarchal process groupings by application types (e.g., policy for web browsers) and still can also allow for custom/special policies. In one embodiment, network/security/IT administrators can also mark binaries/digests of applications downloaded from an external source (e.g., an external/Internet web site or via email, such that source associated with the process ID can also be used in the security policy or signed by a trusted entity such as Apple, Google, Microsoft, or other entity, and such can be monitored by an EP agent and provided to the network device/firewall along with process ID information (or if compiled by local developer on their endpoint)).

Process Updates and New Digests

Digests generated for application programs and other executables can change when the application programs/executables are updated. For example, each update to a commercially available web browser (e.g., a new version of Apple Safari, Google Chrome, and Microsoft IE web browsers) would result in a new digest associated with the updated version of the web browser. As a result, performing a match operation to identify whether process ID information matches a digest for a known, commercially available web browser generally can be implemented by generating and storing digests for each of the previous/past versions and new/updated versions of each of the commercially available web browsers. Digests can be similarly generated and stored for other commercial and proprietary applications used in an enterprise to facilitate matching using the digests for performing the disclosed techniques.

In an example implementation, a security service (e.g., a commercially available security service, such as the WildFire™ cloud-based malware analysis environment provided by Palo Alto Networks®) can monitor for any new, updated versions of applications and generate digests for any new, updated versions of applications using crowd sourced solutions. The security service can execute a predefined list of applications (e.g., based on applications identified of interest by one or more customers/subscribers of the security service) and/or the top n number of applications from a crowd sourced solution (e.g., using crowd sourced applications and alternatives information, such as provided by alternativeto.net) and perform update checks periodically to identify new versions/updates of such applications and then generate digests for any such new versions/updates of such applications. As such, the security service can generally generate the new trusted digest faster than waiting for an upload from a firewall or subscriber to the security service to facilitate process ID information matching and process ID hierarchical, categorization (e.g., Web-Browsers→Chrome.exe→digest1/v43, digest2/v44, digest3/v45, etc.).

Integration with a Security Service to Utilize Telemetry and Big Data Analysis for Providing Enhanced Security In some embodiments, integration with a security service to utilize telemetry and big data analysis is provided for enhanced security. Specifically, sessions from one or more processes may be identified as being of interest (e.g., based on an EP security policy) and additional data may be collected from both the network traffic (e.g., using a firewall for monitoring the network traffic) and from the process executed on the endpoint (e.g., using an agent executed on the endpoint in which the agent is in communication with the firewall).

For example, a security service (e.g., a commercially available security service, such as the WildFire™ cloud-based malware analysis environment provided by Palo Alto Networks®) can receive the collected data for one or more processes that are identified as being of interest (e.g., based on a firewall/EP security policy). The security service can perform various telemetry and big data analysis techniques to identify anomalous network activity/behavior associated with processes that may indicate targeted attacks (e.g., a process that historically/typically only connects to three servers or historically/typically only uses three distinct APP IDs can be identified as potentially being an anomalous process if the analysis of the monitored network activity data for the process indicates that it is connected to a fourth server IP and/or was associated with four different APP IDs).

Integration with a Security Service to Identify Benign or Malware Processes

In some embodiments, integration with a security service to identify benign or malware processes is provided for enhanced security. For example, a list of known binary digests can be provided to a firewall from a security service (e.g., a commercially available security service, such as the WildFire™ cloud-based malware analysis environment provided by Palo Alto Networks®), and the firewall can match them to a list of approved/denied APP IDs for those processes. In this example, correlating process monitoring data from the EP with network monitoring data at the firewall can be performed to determine if a process is sending/receiving APP IDs that have not previously been associated with the process. Such a correlation can be beneficial for processes that were created with hidden routines that are conditionally triggered in various contexts (e.g., as a security service verdict, such as a benign verdict, for the process/application may be incorrect (or at least incomplete) if such malware analysis did not trigger the hidden routine, which can be determined using the disclosed correlation techniques as further described herein).

As another example, correlation of endpoint and network device/firewall monitoring data can similarly be applied to determine whether to perform an action in response to certain network traffic (e.g., block/drop or further monitor/log a session) deemed as a risk for processes that do not yet have a benign verdict from a security service. In this example, if an EP agent informs a network device/firewall that a session is from a process that does not match a benign digest (e.g., has not been previously analyzed/identified as benign by the security service), then the network device/firewall can apply a security policy to block the session, such as if the network session is associated with a high risk APP ID. As such, an enterprise can apply these techniques to specify APP ID-based restrictions and/or based on other criteria (e.g., user ID, content ID, location information, and/or other parameters) in a security policy for unknown processes executed on EPs in the enterprise network (e.g., to reduce security risks associated with unknown processes, which may be associated with a zero day threat or new malware that was not previously identified by the security service).

Selective Resource Allocation from a Network Device/Firewall to Endpoint Agents for Processing In some embodiments, selective resource allocation from a network device (e.g., a firewall) to EP agents for processing is performed. For example, if the network device is processing at or near processing capacity, then the network device/firewall can be configured to allocate certain firewall/security processing to an EP agent to be performed locally at the EP utilizing the EP's processing resources (e.g., CPU and memory) to perform certain firewall processing functions. For instance, EP endpoint processing power can be utilized for resource expensive traffic itself (e.g., decompression and/or decryption of network traffic and/or files associated with the network traffic).

Example Use Case Scenarios for Fine-Grained Policy Enforcement with Process ID Information As a first example use case scenario, the disclosed techniques can be applied to allow enterprises to apply different security policies to binaries executed on EPs that perform network activities that are not typically associated with such binaries (e.g., APP IDs that are not whitelisted or allowed for such binaries, based on a security/firewall policy). For example, a ransomware attack can be spread as a file (e.g., a JavaScript file with a .js file extension) attached to an email and is launched/executed when double clicked/opened on an EP device (e.g., a Microsoft Windows or other computing device). The launched/executed file then downloads and executes an executable binary file (e.g., a wscript.exe binary) on the EP device. The executable binary file then performs network activities that appear to a firewall/network device as web browsing related network activities (e.g., APP ID is web browsing). However, in this example, the executable binary file should not be performing web browsing related network activities (e.g., it is not a known process ID/application, such as a known/commercially available web browser). As such, the disclosed techniques can be applied to block such ransomware based on a policy that utilizes APP ID and process ID information to perform fine-grained security policy enforcement, which would not have previously been blocked by existing firewall techniques.

As a second example use case scenario, the disclosed techniques can also be applied to allow enterprises to apply different security policies to unknown/untrusted binaries executed on EPs that perform network activities. For example, an enterprise can configure a policy (e.g., implemented by a firewall/network device and/or implemented locally at an EP by an agent executed on the EP) to perform a responsive action (e.g., block/drop, hold/quarantine, log, throttle, and/or perform other responsive actions) for all packets associated with a session associated with an unknown/untrusted binary (e.g., unknown/untrusted process ID) until an APP ID associated with the session is determined. After the APP ID associated with the session is determined, the firewall/network device performs a responsive action (e.g., allow, block/drop, hold/quarantine, log, throttle, and/or perform other responsive actions) based on a fine-grained security policy using the correlated APP ID and process ID information (e.g., and in some cases, in combination with other information).

As a third example use case scenario, the disclosed techniques can also be applied to provide for security protection against a rootkit malware attack. For example, assume that a binary/code is executing within kernel space on an EP. In this example, the EP agent typically cannot detect such malware activities executed in the kernel (e.g., assuming that the agent is only monitoring user space activities on the EP). However, the firewall/network device can detect network traffic that is not typical of, in this example, a Windows laptop, and that user endpoint's agent did not associate that traffic with any user level application, and the firewall/network device can be configured to perform rootkit detection for network activities associated with that session.

As a fourth example use case scenario, the disclosed techniques can also be applied to logs of monitored network traffic/sessions (e.g., firewall/network device logged data of network traffic/sessions) to associate/correlate blocked or unblocked network traffic/sessions with logged process IDs on the EP (e.g., agent logged data of process IDs executed on the EP). For example, the correlation of such logged network traffic sessions with process IDs on the EP can be performed to determine which process ID was causing a particular network traffic/session and why it may not have been blocked/dropped or some other responsive action performed by the firewall/network device and/or agent. In some cases, these techniques can be applied to help IT/network/security admins and/or a security service perform troubleshooting and determine if a particular binary (e.g., process ID) may be suspicious/malware, a custom/new binary (e.g., and should be whitelisted), or may potentially be a result of a spoofed IP address being used for the traffic if an authenticated agent on the EP did not detect a locally executed process associated with that network activity/session or may indicate a rootkit on the EP.

Overview of Techniques for Outbound/Inbound Lateral Traffic Punting Based Upon Process Risk As similarly discussed above, while existing advanced or next generation firewalls generally can perform stateless and stateful packet filtering and application layer filtering as discussed above, an enterprise (e.g., Information Technology (IT), network, and/or security administrator (admin) for the enterprise) may desire to implement more fine-grained security policies (e.g., a fine-grained firewall policy) that can be applied to lateral traffic in an enterprise network. For example, detecting suspicious lateral movement (e.g., suspicious outbound/inbound lateral traffic) in an enterprise network is desirable to counter sophisticated attackers that may use more targeted approaches to spread through a network during a search for key assets and data (e.g., a lateral attack phase that attempts to perform lateral movement in an enterprise network and evade detection/security policy enforcement during such lateral movement in the enterprise network).

Thus, what are needed are new and improved techniques for detecting suspicious lateral movement and to perform outbound/inbound lateral traffic punting based upon process risk. Accordingly, techniques for outbound/inbound lateral traffic punting based upon process risk are disclosed. In some embodiments, new and improved techniques for outbound/inbound lateral traffic punting based upon process risk are disclosed using an EP agent to monitor a socket mapping to determine a process ID (e.g., digest) and a source IP address, a destination IP address, and a port number of a network session associated with the process ID, which is then utilized to selectively punt lateral traffic (e.g., based on an EP security policy) to a network device for traffic inspection (e.g., inspecting session traffic using a firewall implemented by the network device) and/or a security service for traffic inspection. For example, a firewall policy (e.g., a fine-grained firewall policy enforced using the network device/firewall) can be configured to allow a network session associated with a trusted/known process ID to move laterally without the performance penalty of traffic inspection at the network device, while still allowing for visibility/control into perceived lateral movement associated with a potentially risky/malicious process (e.g., a network session associated with an untrusted/unknown process ID or other types of potentially risky/malicious processes/process activities).

In some embodiments, selective punting (e.g., tunneling) of network traffic is performed based on process ID information associated with the network traffic. For example, a known/trusted/whitelisted process ID digest (e.g., based on an EP security policy) can be allowed to continue to its destination on a shortest path, whereas an unknown/untrusted/blacklisted process ID digest (e.g., based on the EP security policy) can be punted/redirected to a designated firewall for further inspection as further described below.

For example, the selected network traffic (e.g., for a network session associated with an untrusted/unknown process ID) can be routed over a pre-established tunnel (e.g., a Virtual Private Network (VPN) tunnel) to a network device (e.g., implementing a firewall) and/or to a security service (e.g., a cloud-based security service, such as the GlobalProtect® cloud service, which is a commercially available cloud-based security service provided by Palo Alto Networks, Inc.) for performing a security inspection of the selected network traffic. In this example, an EP agent can be configured with a policy (e.g., an EP security policy) for selectively forwarding certain network traffic based on process ID information (e.g., for a network session associated with an untrusted/unknown process ID or other types of potentially risky/malicious processes/process activities).

In some cases, the policy can include a whitelist and/or blacklist of processes (e.g., process digests), which may be administrator selected and/or based upon an automated security risk analysis from a security service (e.g., a commercially available security service, such as using the WildFire™ cloud-based malware analysis environment provided by Palo Alto Networks, Inc.). For example, processes with traffic of interest may include uncommon processes (e.g., not commonly monitored by the firewall and/or the security service), processes historically known to be exploited, processes with known vulnerabilities, and/or administrator included/excluded processes (e.g., included on the whitelist and/or blacklist of processes).

As another example, inbound traffic that is destined for a potentially risky/malicious process (e.g., a network session associated with an untrusted/unknown process ID) may also be punted to a network device and/or a security service for traffic inspection. In some embodiments, to avoid double punting, if traffic is inspected on an outbound device/server, then a header flag in a packet can be set to verify such traffic inspection to the receiving device/server to avoid performing the double inspection (e.g., to avoid double inspection, the receiving side/EP device of the network session can identify whether or not the sender side/EP device of the network session has an installed and functioning EP agent, which can be performed using out-of-band and/or in-band communications, such as by having direct EP agent to EP agent communication, or through processing potentially modified (such as by sender EP agent) packets (header flag in this example) as they are received as described in this example). For example, for a Windows file sharing server, all authenticated/trusted users are supposed to be using enterprise issued computers, which should have an EP agent installed. If a session that is not already punted, or otherwise marked trusted by an agent arrives, then the receiving device/server is configured to perform more inspection on the network traffic.

Thus, the disclosed techniques can be applied to select network traffic to send to a firewall and for traffic inspection when there is not a firewall already in the network path of the selected network traffic. As such, selected lateral traffic can be inspected and policy controlled by the firewall rather than freely passing through an internal enterprise network (e.g., which could otherwise traverse laterally through an internal enterprise network without being inspected by a firewall). For example, an EP security policy implemented by an EP agent executed on an EP device can be applied to select network traffic sessions (e.g., outbound/inbound lateral traffic) associated with a potentially risky/malicious process (e.g., a network session associated with an untrusted/unknown process ID) for inbound/outbound punting for inspection using a firewall, which is more efficient and effective as it is generally too computationally expensive to inspect all lateral movement within a network (e.g., an enterprise network).

Example Use Case Scenarios for Outbound/Inbound Lateral Traffic Punting Based Upon Process Risk The disclosed techniques for outbound/inbound lateral traffic punting based upon process risk can be applied to various example use case scenarios. As a first example use case scenario, assume that network traffic is received at a device/server on an enterprise network from an unknown source (e.g., and, in some cases, that there is not an EP agent installed/executing on the source device/server) or an unknown process, and assume that the network traffic has not already passed through a firewall on the enterprise network (e.g., the traffic was not previously inspected by the firewall), then the EP agent on the receiving device/server can redirect (e.g., via tunneling) that session to the firewall for additional inspection.

As a second example use case scenario, assume that a laptop without an EP agent is infected with malware (e.g., Trojan, rootkit, or other malware) or a server without an EP agent (e.g., a server that is on the enterprise network but is not managed by enterprise Information Technology (IT), such as a lab server or other server) is infected with malware (e.g., Trojan malware or other malware) and attempts to access a managed/protected EP device (e.g., another laptop or a protected server, such as an Active Directory (AD) server, file share server, web server, and/or another server) (e.g., in this example policy, an EP device not trusted just because it has been allocated a local IP address via plug-in LAN access or DHCP on the enterprise network, and traffic is not tagged, so it can be determined that the traffic has not previously passed through and been inspected by an enterprise firewall and there is no locally installed/executing EP agent on the source device), then such traffic can be punted/redirected to the firewall for additional inspection.

As a third example use case scenario, network sessions can be redirected to a captive portal to require periodic user authentication (e.g., single factor or multifactor authentication (MFA)) and provide for authentication for a period of time (e.g., one hour, one day, one week, etc.). In this example, MFA can also be required based on traffic profiling (e.g., the network session can be authorized for web browsing but not for other types of network activities/access, such as not allowed to access the AD server, SMB server, and/or other resources on the enterprise network). As another example, users on endpoint devices that do not have an EP agent installed/executing can be automatically redirected to a captive portal to download an EP agent.

As a fourth example use case scenario, the disclosed techniques can be applied to restrict lateral traffic access to a resource on an enterprise network. For example, an EP agent can be installed and configured on a resource (e.g., a source code repository (SCR) server or other resource on the enterprise network) to only allow authenticated users/EPs to access the SCR server (e.g., assigned IP address range/locked down to an IP range and/or periodic MFA requirements for authentication as similarly described above).

As a fifth example use case scenario, the disclosed techniques can be applied to detect rootkits that may otherwise evade EP/host agent detection/security policy enforcement. For example, assume that an EP device/server is infected with a rootkit and the rootkit attempts lateral movement. The rootkit can be detected when the network session cannot be matched to an EP agent socket. As another example, unknown network sessions and/or SSL/encrypted network sessions can have a process ID associated with such sessions.

As a sixth example use case scenario, the disclosed techniques can be applied to enforce a more fine-grained security policy for web browsing network traffic. For example, web browsing network traffic may be allowed/disallowed based upon associated process ID information, allowing control over which browsers can access which resources in an enterprise network. The disclosed techniques can also be applied to prevent potentially malicious processes/applications communicating over higher risk protocols, while allowing those protocols to still be allowed for certain other processes/applications (e.g., based on a fine-grained firewall policy). As an example, a security policy can be configured for a network device and EP agents to disallow traffic types other than HTTP/HTTPS for web browsing network traffic.

As a seventh example use case scenario, the disclosed techniques can be applied to disallow network traffic or to divert network traffic to a different network segment if such is associated with a source device/server that has an EP agent that is disabled, compromised, malfunctioning, and/or uninstalled.

In an example implementation, EP agent(s) can include a GlobalProtect (GP) agent that is commercially available from Palo Alto Networks, Inc. or another agent/component that is capable of monitoring new network connections/activities for EPs and can be configured to punt/redirect (e.g., using a VPN tunnel or other secure communication technique) inbound/outbound traffic based on a policy (e.g., an endpoint security policy). The disclosed techniques can be implemented to facilitate a more granular security for enterprise networks as processes/traffic need not be trusted even if from an internal device on the enterprise network (e.g., lateral movement within the internal network) with a local IP address (e.g., no EP agent is installed/executing, and such can be associated with a valid user attempting an unauthorized access and/or a malware process executing on a local device/server attempting unauthorized access).

Accordingly, various techniques for providing fine-grained firewall policy enforcement (e.g., security/firewall policy enforcement at the network device) using session APP ID and endpoint Process ID correlation are disclosed. In addition, various techniques for providing outbound/inbound lateral traffic punting based upon process risk (e.g., based on a fine-grained firewall policy) are disclosed. As will be apparent to one skilled in the art in view of the various techniques and embodiments described herein, the various techniques described herein for providing fine-grained firewall policy enforcement and/or outbound/inbound lateral traffic punting based upon process risk can similarly be performed using cloud-based security solutions, network device-based security solutions, host-based/agent-based security solutions, virtualized/software-defined networking (SDN)-based security solutions, and/or various combinations thereof, such as further described below with respect to various embodiments.

A System Architecture of a Network Device for Providing Fine-Grained Policy Enforcement and/or Outbound/Inbound Lateral Traffic Punting Based Upon Process Risk FIG. 1 is a diagram of an architecture of a network device that can be used for providing fine-grained policy enforcement and/or outbound/inbound lateral traffic punting based upon process risk in accordance with some embodiments. As shown in FIG. 1, network traffic is monitored at a firewall 100. In one embodiment, network traffic is monitored using a network device, such as a data appliance (e.g., a data appliance that includes security functions, such as a security device/appliance that includes a firewall). In one embodiment, network traffic is monitored using a network device, such as a gateway (e.g., a gateway that includes security functions, such as a security gateway). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app) identifier (ID) and user identifier (ID) engine (e.g., shown as APP ID Check and User ID Check component 108 in FIG. 1, which can be implemented as an integrated component or as distinct components in firewall 100). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. A policy check engine 106 determines whether any policies can be applied based on the IP address and port number. As also shown in FIG. 1, an APP ID Check and User ID Check 108 identifies an application and a user associated with the monitored network traffic (e.g., session). For example, the application can be identified using the APP ID engine (108) using various application signatures for identifying applications based on packet flow analysis. The user identification can also be determined based on a source IP address using the user ID check engine (108). In this example, the APP ID engine (108) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to process the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., a decrypt component of firewall 100 for applying trusted man-in-the-middle techniques using a self-signed certificate, such as further described below). A known protocol decoder engine 112 decodes and analyzes traffic flows using known protocols (e.g., a known protocol decoder component of firewall 100 for applying various signatures for the known protocol) and reports the monitored traffic analysis to a report and enforce policy engine 120 (e.g., a report and enforce policy component of firewall 100 for performing reporting and enforcement actions based on a policy, such as further described below). Identified traffic (no decoding required) engine 114 reports the identified traffic to the report and enforce policy engine 120. An unknown protocol decoder engine 116 decodes and analyzes traffic flows (e.g., an unknown protocol decoder component of firewall 100 for applying various heuristics for network traffic using an unknown protocol) and reports the monitored traffic analysis to the report and enforce policy engine 120.

In one embodiment, the results of the various traffic monitoring techniques using known protocol decoder engine 112, identified traffic engine 114, and unknown protocol decoder engine 116 described above are provided to report and enforce policy engine 120 (e.g., network/routing policies, security policies, and/or firewall policies, which can include fine-grained firewall policies). For example, firewall policies can be applied to the monitored network traffic using application identification, user identification, content identification (e.g., APP ID and user ID check component 108 can also include a content ID component as an integrated distinct component of firewall 100, in which the content ID component can provide real-time content scanning, such as for monitoring and/or controlling file transfer activities), and/or other information to match signatures (e.g., file-based, protocol-based, and/or other types/forms of signatures for detecting malware or suspicious behavior).

In one embodiment, firewall 100 also includes a content ID engine (not shown). In one embodiment, the content ID engine's identified content is also used by report and enforce policy engine 120, possibly in various combinations with other information, such as application, user, and/or other information, to enforce various security/firewall policies/rules (e.g., a fine-grained firewall policy).

In one embodiment, firewall 100 also includes an endpoint process ID correlation component 118 and fine-grained policy enforcement component 122 for providing fine-grained policy enforcement using the firewall. For example, the firewall can receive and store process ID information associated with a session from an EP agent, and the combination of the APP ID (and user ID information, content ID information, and/or other information) correlated with the process ID information can be provided to the report and enforce policy (120) to facilitate providing fine-grained policy enforcement (122) using the disclosed techniques, such as described above and further described below. If the session is determined to be associated with an unauthorized network activity, then the firewall (100) can determine a responsive action based on the fine-grained policy (122). These and other examples for providing fine-grained policy enforcement and/or outbound/inbound lateral traffic punting based upon process risk, including utilizing endpoint agent and cloud security techniques that can be integrated with network device-based firewall techniques, will be further described below.

In one embodiment, various other functional architectures and flows are provided to implement techniques for providing fine-grained policy enforcement and/or outbound/inbound lateral traffic punting based upon process risk (e.g., including using a firewall and/or other techniques, including endpoint agent and cloud security techniques that can be integrated with network device-based firewall techniques) as described herein. For example, some of these network device-based firewall functions can be implemented in software executed on a general processor and/or some of these functions can be implemented using hardware acceleration techniques for faster packet processing of network traffic, such as further described below.

Figure 2:
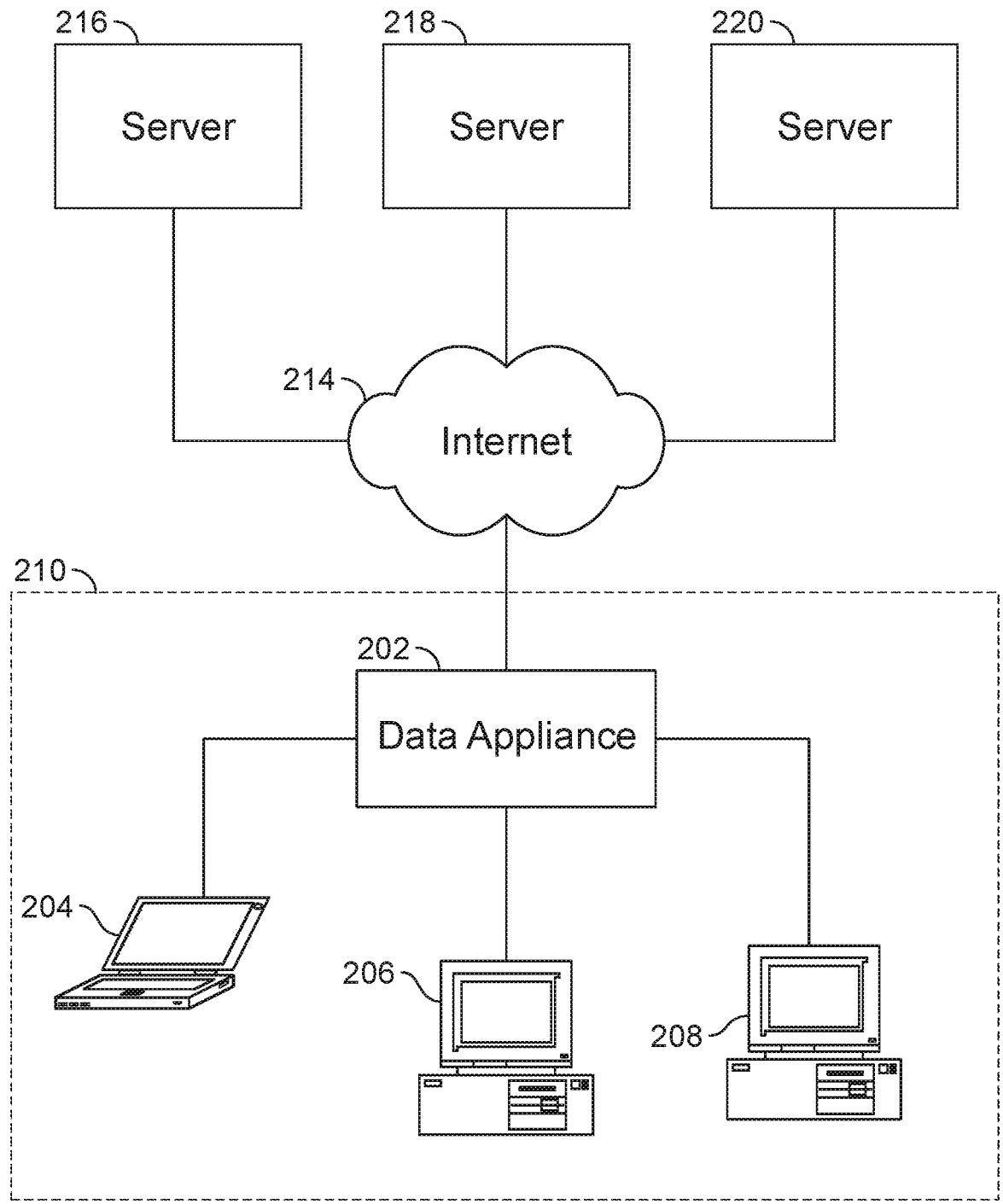
FIG. 2 is a diagram of a network architecture that can be used for providing fine-grained policy enforcement and/or outbound/inbound lateral traffic punting based upon process risk in accordance with some embodiments.

A Network Architecture for Providing Fine-Grained Policy Enforcement and/or Outbound/Inbound Lateral Traffic Punting Based Upon Process Risk FIG. 2 is a diagram of a network architecture that can be used for providing fine-grained policy enforcement and/or outbound/inbound lateral traffic punting based upon process risk in accordance with some embodiments. As shown, a data appliance 202 (e.g., a network device that includes security functions, such as a security appliance/device that includes a firewall, a gateway that includes security functions, such as a security gateway, a server that includes security functions, and/or any other network device that includes a firewall function as described herein) is at the perimeter of a protected network 210, which includes clients 204, 206, and 208 (e.g., desktop computers, laptop computers, tablet computers/tablets, smart phones, and/or other types of client devices that can access data on enterprise network 210 using network communications (wired or wireless network communications, and/or can transfer data from the client device and/or other devices on enterprise network 210 to a local storage, such as a portable storage device/USB storage device)).

In one embodiment, data appliance 202 includes a firewall component, such as firewall 100 as described above, to protect the network and clients within the protected network 210, which is in communication with the Internet 214 and various servers, such as servers 216, 218, and 220 (e.g., web servers, mail servers, file servers, and/or other types of servers). Client devices each include an EP agent installed and executed that can securely communicate process ID information to the data appliance (202) as similarly described above and further described below.

Figure 3:
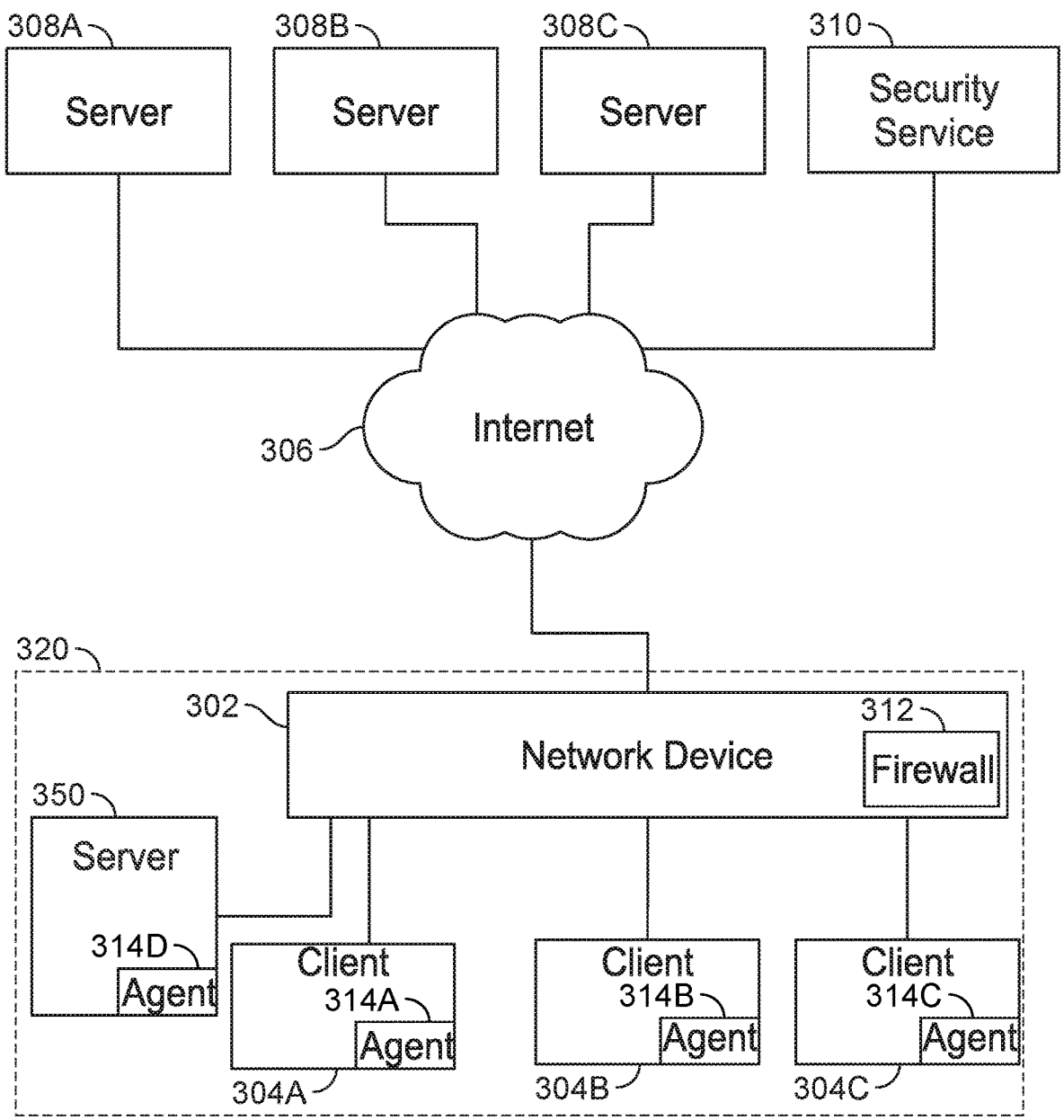
FIG. 3 is a diagram illustrating another network architecture for providing fine-grained policy enforcement and/or outbound/inbound lateral traffic punting based upon process risk in accordance with some embodiments.

FIG. 3 is a diagram illustrating another network architecture for providing fine-grained policy enforcement and/or outbound/inbound lateral traffic punting based upon process risk in accordance with some embodiments. As shown in FIG. 3, client devices 304A, 304B, and 304C are in communication with the Internet 306 and various web sites, cloud services, and/or other remote servers/sites shown as servers 308A-C via a network device 302 (e.g., a data appliance, such as similarly described above with respect to FIG. 2). In one embodiment, the network device 302 includes a firewall 312 (e.g., a firewall component that can be implemented in software executed on a hardware processor of the network device, or implemented in hardware at least in part such as similarly described herein, and/or a combination thereof) as shown, which can be used for security for enterprise network 320. In one embodiment, the network device 302 includes a data appliance (e.g., a security appliance), a gateway (e.g., a security server), a server (e.g., a server that executes security software including firewall 312), and/or some other network/security device, which, for example, can be implemented using computing hardware, software, or various combinations thereof.

As shown, client devices 304A-304C include host agents 314A-314C and a server 350 (e.g., a file (SMB) server, an authentication server, a web server, an application server, a data store/database, a source code repository (SCR), and/or another enterprise resource/server/data appliance) that includes a host agent 314D (e.g., the host agent is also referred to herein as an EP agent). For example, the agents (314A-314D) can be implemented as an endpoint (EP) agent (e.g., an EP network/security agent), executed on the client/host device (e.g., implemented in software that can be executed on a hardware processor of the client/host device) that can perform various functions in coordination with network device 302, firewall 312, and/or a security service 310 (e.g., a cloud security service) to facilitate endpoint protection and to facilitate the various techniques for providing fine-grained policy enforcement and/or outbound/inbound lateral traffic punting based upon process risk, such as further described below. In an example implementation, the agents (314A-314D) can be provided by a lightweight agent (e.g., a commercially available endpoint agent, such as the Palo Alto Networks® Traps™ agent available from Palo Alto Networks, Inc., which is a highly scalable, lightweight agent for endpoint security, a Palo Alto Networks® GlobalProtect client (GP) as similarly described above, and/or other commercially available EP agent solutions) that can be executed on, for example, a variety of different client/host device platforms (e.g., Microsoft® Windows® OS platforms, Apple iOS/MAC® OS platforms, Google Android® OS platforms, Linux OS platforms, and/or other operating systems for clients, servers, and/or mobile phones/other devices) to facilitate performing the disclosed techniques in coordination with network device 302, firewall 312, and/or a cloud security service 310, such as further described below.

For example, the disclosed techniques can be performed to apply fine-grained policy enforcement to protect an enterprise resource (e.g., a client device (304A-C), a server (350), and/or another resource/device on the enterprise network). As another example, the disclosed techniques can be performed to redirect outbound/inbound lateral traffic based upon process risk to protect the enterprise resource (e.g., a client device (304A-C), a server (350), and/or another resource/device on the enterprise network), such as to detect/respond to an unknown/untrusted process ID attempting to access the enterprise resource and/or to detect/respond to another suspicious/malicious activity targeting the enterprise resource.

As will now be apparent, various functions described with respect to FIGS. 1-3 can be assisted by or implemented (in part) by security service 310. For example, security service 310 can reduce the processing on the network device 302. As another example, detection of firewall policy violations based on a fine-grained policy can be reported to security service 310 by network device 302 and/or outbound/inbound lateral traffic can be punted to security service 310 based upon process risk. In an example implementation, the enterprise network is subscribed to the security service, and the network device can securely communicate with the security service (e.g., using a commercially available cloud-based security service, such as provided by Palo Alto Networks® that provides API support via the WildFire API, such as for submission of files or PCAPs or other content for malware analysis). Another example is using a URL filtering subscription service (e.g., Palo Alto Networks PANdb URL filtering subscription service or another commercially available URL filtering subscription service) to submit one or more URLs (e.g., the submission of a URL, full or part of a web page, statistics/transformed version of a webpage, which can include a list of form field names, types, default values, parameters, etc.) for cloud-based, asynchronous analysis. The results of the cloud-based, asynchronous analysis can then be provided back to the network device/firewall (and/or other network/filtering devices) and/or the EP agents for possible responsive actions.

Figure 4:
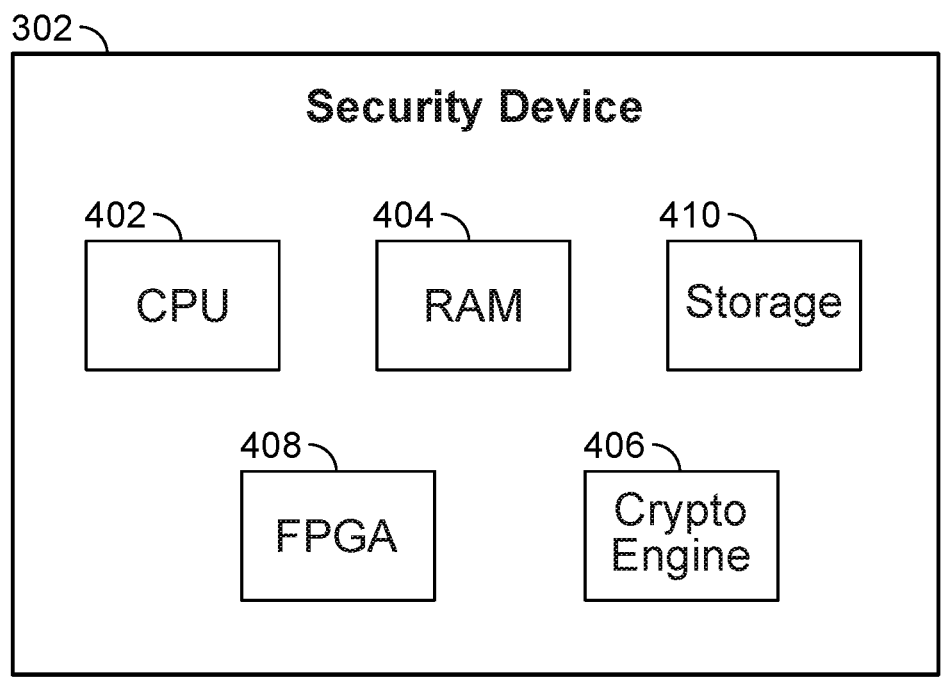
FIG. 4 is a diagram of hardware components of a network device for providing fine-grained policy enforcement and/or outbound/inbound lateral traffic punting based upon process risk in accordance with some embodiments.

Hardware Components of a Network Device for Providing Fine-Grained Policy Enforcement and/or Outbound/Inbound Lateral Traffic Punting Based Upon Process Risk FIG. 4 is a diagram of hardware components of a network device for providing fine-grained policy enforcement and/or outbound/inbound lateral traffic punting based upon process risk in accordance with some embodiments. The example shown is a representation of physical/hardware components that can be included in network device 302 (e.g., an appliance, gateway, or server). Specifically, network device 302 includes a high performance multi-core CPU 402 and RAM 404. Network device 302 also includes a storage 410 (e.g., one or more hard disks or solid state storage units), which can be used to store policy and other configuration information as well as signatures. In one embodiment, storage 410 stores a fine-grained policy, and a table(s) (e.g., or another data store format) that includes process ID information (e.g., process ID digests), associated network session information (e.g., associated IP addresses), APP ID for the associated network session, and possibly other information (e.g., user ID, content ID, and/or other information) for providing fine-grained policy enforcement and/or outbound/inbound lateral traffic punting, such as further described below. Network device 302 can also include one or more optional hardware accelerators. For example, network device 302 can include a cryptographic (crypto) engine 406 configured to perform encryption and decryption operations, and one or more FPGAs 408 configured to perform signature matching, act as network processors, and/or perform other tasks.

Figure 5:
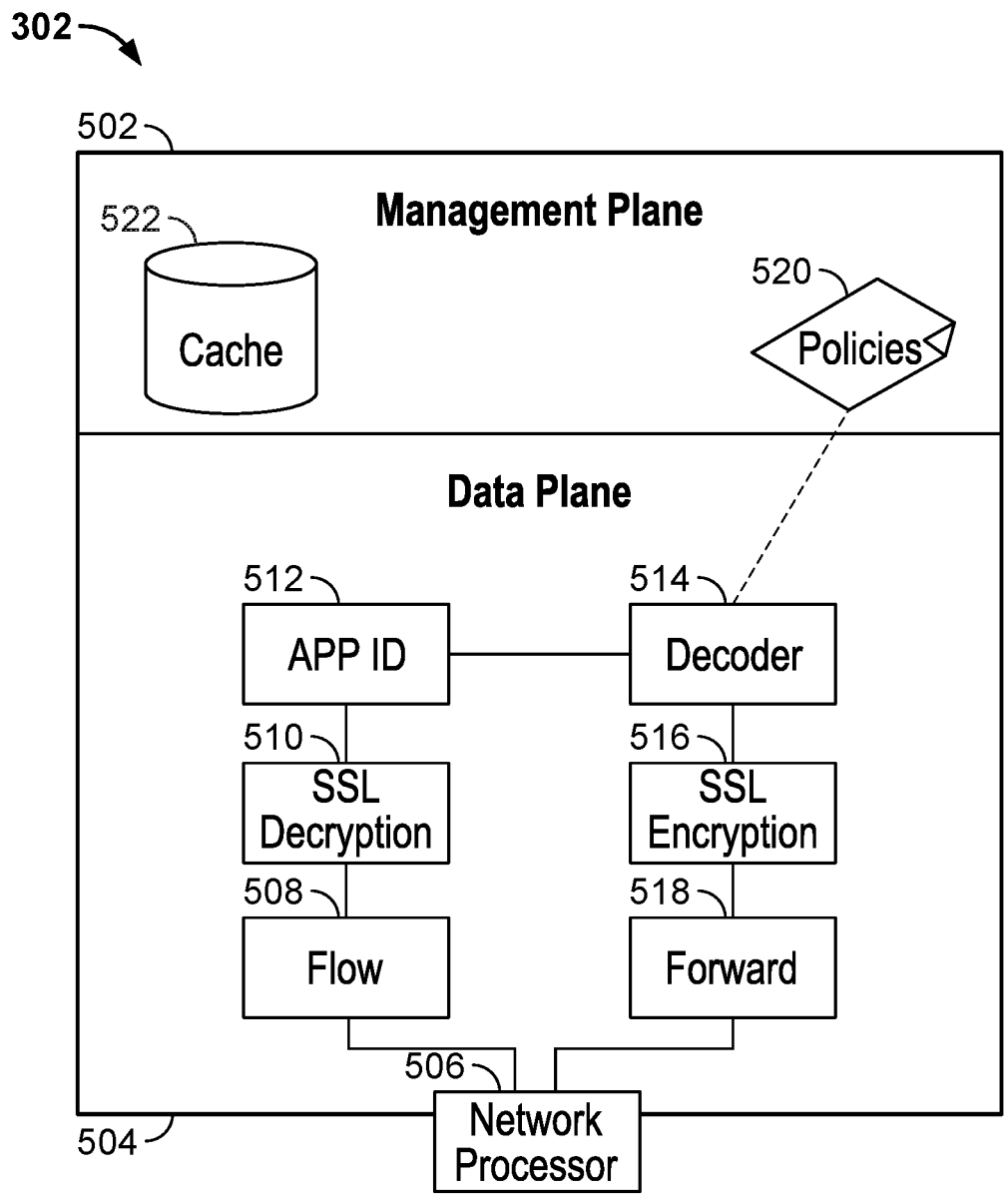
FIG. 5 is a diagram of logical components of a network device for providing fine-grained policy enforcement and/or outbound/inbound lateral traffic punting based upon process risk in accordance with some embodiments.

Logical Components of a Network Device for Providing Fine-Grained Policy Enforcement and/or Outbound/Inbound Lateral Traffic Punting Based Upon Process Risk FIG. 5 is a diagram of logical components of a network device for providing fine-grained policy enforcement and/or outbound/inbound lateral traffic punting based upon process risk in accordance with some embodiments. The example shown is a representation of logical components that can be included in network device 302. As shown, network device 302 includes a management plane 502 and a data plane 504. In one embodiment, the management plane is responsible for managing user interactions, such as by providing a user interface for configuring policies and viewing log data. The data plane is responsible for managing data, such as by performing packet processing and session handling.

Suppose a client 304A attempts to access a server 308B using an encrypted session protocol, such as SSL. Network processor 506 is configured to receive packets from client 304A, and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decryption engine 510 (e.g., as similarly described above with respect to decrypt component 110 of FIG. 1) using various techniques as described herein. Otherwise, processing by SSL decryption engine 510 is omitted. Application identification and user identification (APP ID) module 512 is configured to determine what type of traffic/protocol the session involves and to identify a user associated with the traffic flow for providing app/user control and content control for performing the disclosed techniques for providing fine-grained policy enforcement and/or outbound/inbound lateral traffic punting based upon process risk (e.g., as similarly described above with respect to APP ID and user ID check component 108 of FIG. 1). For example, APP ID 512 can recognize a GET request in the received data and conclude that the session requires an HTTP decoder. For each type of protocol, there exists a corresponding decoder 514 (e.g., as similarly described above with respect to network traffic processing components 112, 114, and 116 of FIG. 1). In one embodiment, the application identification is performed by an application identification module (e.g., APP-ID engine/component), a user identification is performed by another function/component, and/or a content identification is performed by yet another function/component. Based on the determination made by APP ID 512, the packets are sent to an appropriate decoder 514. Decoder 514 is configured to assemble packets (e.g., which may be received out of order) into the correct order, perform tokenization, and extract out information (e.g., to extract URLs and/or other information). Decoder 514 also performs signature matching to determine what should happen to the packet. SSL encryption engine 516 performs SSL encryption using various techniques as described herein. Packets can be forwarded using forward component 518. As also shown, policies 520 (e.g., including fine-grained firewall policies) are received and stored in the management plane 502. In one embodiment, policy enforcement (e.g., policies can include one or more rules, which can be specified using domain and/or host/server names, and rules can apply one or more signatures or other matching criteria or heuristics, including rules based on correlated APP ID and process ID information (and optionally other information, such as user ID, content ID, URL, and/or other information), such as for providing fine-grained policy enforcement and/or outbound/inbound lateral traffic punting based upon process risk as disclosed herein) is applied as described herein with respect to various embodiments based on the monitored, decrypted, identified, and decoded session traffic flows.

As also shown in FIG. 5, a cache 522 (e.g., a process ID cache, which can maintain a table or other data store format that includes process ID (process ID digests) and associated session information) is also provided for maintaining process ID information for sessions on an enterprise network (e.g., process ID information can be received from EP agents as disclosed herein) that can be used to implement the disclosed techniques for providing fine-grained policy enforcement and/or outbound/inbound lateral traffic punting based upon process risk as will be further described below. For example, the process ID cache can be maintained in the management plane (as shown) and/or the data plane of the network device.

Figure 6:
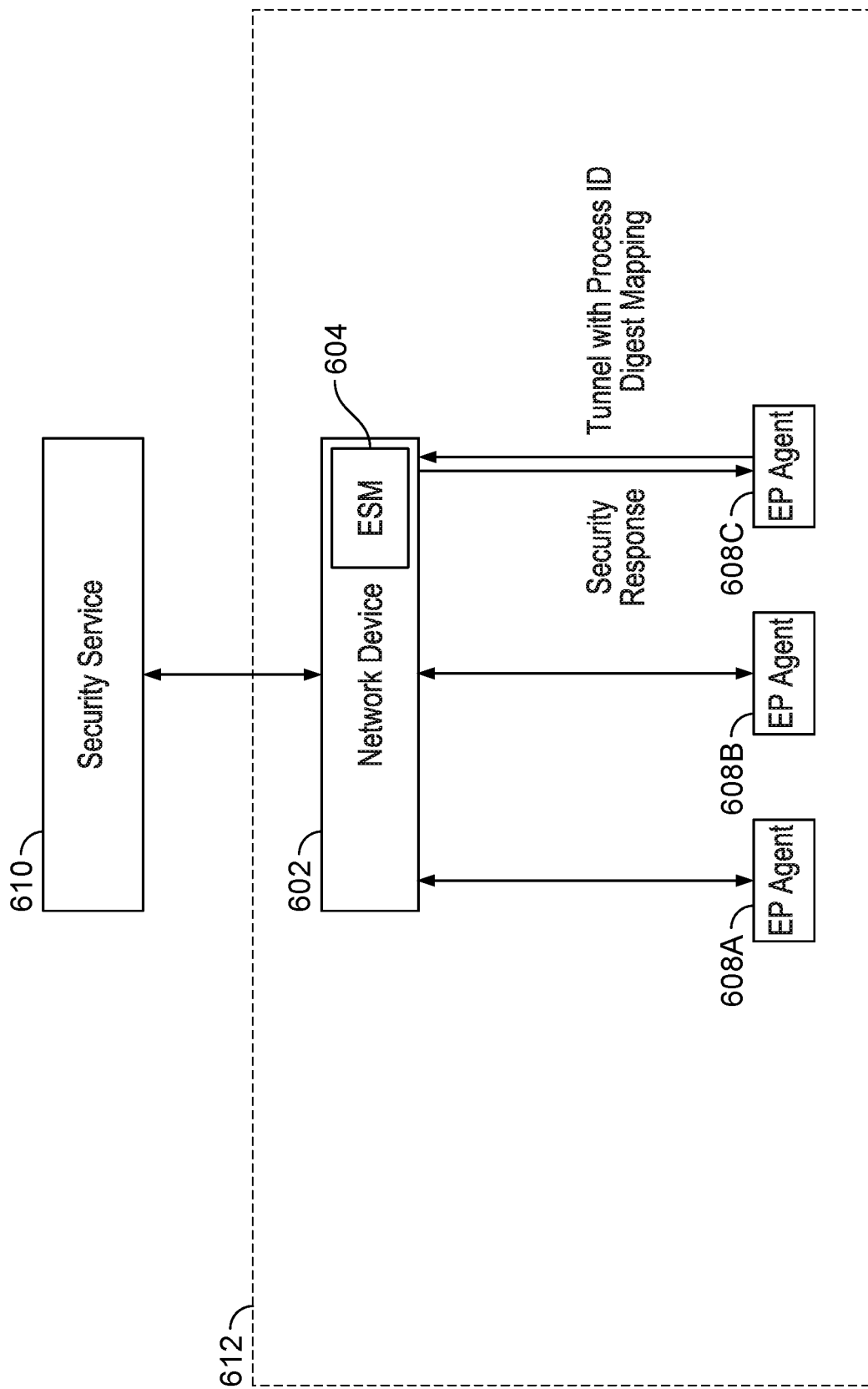
FIG. 6 is a diagram of a network architecture of an integrated security solution for providing fine-grained policy enforcement and/or outbound/inbound lateral traffic punting based upon process risk in accordance with some embodiments.

Integrated Security Solution for Providing Fine-Grained Policy Enforcement and/or Outbound/Inbound Lateral Traffic Punting Based Upon Process Risk FIG. 6 is a diagram of a network architecture of an integrated security solution for providing fine-grained policy enforcement and/or outbound/inbound lateral traffic punting based upon process risk in accordance with some embodiments. In one embodiment, a network device 602 can be implemented as similarly described above with respect to FIGS. 1-5 and can perform the functions described above with respect to FIGS. 1-5 and as further described below.

Referring to FIG. 6, an enterprise network 612 includes network device 602. In one embodiment, network device 602 is in (secure) communication with or is integrated with an Endpoint Security Manager (ESM) 604 (as shown) for managing endpoint (EP) agents 608A, 608B, and 608C (e.g., host/EP agents, such as similarly described above). In an example implementation, the ESM can be implemented as a distinct component/server or can be implemented as an integrated component of the network device. For example, the ESM can be implemented using commercially available management solutions available from Palo Alto Networks, Inc. or other commercially available management solutions, such as Endpoint Security Manager (ESM) servers for management of the endpoint security agents and an ESM console for managing multiple ESM servers.

In one embodiment, a Network Gateway FireWall Manager (NGFWM) (not shown) is provided for managing Network Gateway FireWall (NGFW) devices (e.g., network devices/firewalls, such as network device/firewall 602 as shown in FIG. 6). In this example, the ESM (604) can be integrated with or in communication with the NGFWM. In an example implementation, the NGFWM can be implemented as a distinct component/server or can be implemented as an integrated component of one or more of the network devices on the enterprise network. For example, the NGFWM can be implemented using commercially available management solutions available from Palo Alto Networks, Inc. for managing multiple network devices/firewalls, such as the Panorama™ network security management for centralized device management that enables users to centrally manage the process of configuring network devices, deploying security policies, performing forensic analysis, and generating reports across an entire network of next-generation firewalls (e.g., available as either a virtual appliance or a dedicated management platform). For instance, the NGFWM can be implemented using commercially available management solutions available from Palo Alto Networks, Inc. or other commercially available management solutions, such as NGFWM servers for management of the network devices/firewalls and an NGFWM console for managing multiple network devices/firewalls.

As shown, network device 602 is in communication with a security service 610. For example, the security service can provide similar integration and coordination as similarly described above with respect to security service 310 of FIG. 3 and as further described below. In an example implementation, the security service can be implemented using a commercially available security service, such as the WildFire™ cloud-based malware analysis environment provided by Palo Alto Networks®.

As also shown in FIG. 6, EP agents 608A-C are in communication with network device 602 (e.g., various secure communication/tunneling techniques can be implemented between the EP agents and the network device as similarly described above). For example, EP agent 608C can be configured with a policy (e.g., an EP security policy) to report process ID information (e.g., digests as similarly described above) and associated session information (e.g., source/destination port numbers and IP address information, and optionally other information) for selected processes (e.g., unknown/trusted processes or otherwise suspicious processes, and, in some cases, known/trusted processes, such as based on the EP security policy) to network device 602. Network device 602 can store the process ID information and associated network session information (e.g., in a cache as similarly described above). If the session would not otherwise be inspected/pass through network device 602, then EP agent 608C can be configured with a policy (e.g. an EP security policy) to punt/redirect the session to network device 602 to allow for security inspection using network device 602. Network device 602 inspects network traffic associated with the network session, and determines an APP ID (e.g., and potentially other information, such as user ID, content ID, URL, and/or other information) that is correlated with the process ID information for the same network session. Network device 602 applies the policy using the correlated APP ID and process ID information (e.g., and potentially other information, such as user ID, content ID, URL, and/or other information) to determine whether to perform a responsive action (e.g., based on this correlated information and one or more rules configured in a security/firewall policy, such as a fine-grained firewall policy). In this example, network device 602 provides a security response to EP agent 608C as shown in FIG. 6, such as to allow or kill the process and/or perform another responsive action. The network device can also perform responsive/security actions at the network device, such as to allow, drop, or block the network traffic at the network device. As also shown in this example, network device 602 is in communication with security service 610, and, in some cases, the network device provides the correlated APP ID and process ID information (e.g., the malware process and digest mapping, and potentially other information, such as user ID, content ID, URL, and/or other information) to the security service, which can perform further analysis of the process (e.g., the security service can provide a verdict based on determining whether the process is malware (and should be added to a blacklist of unauthorized processes for the associated APP ID) or is known/trusted (and should be added to a whitelist of authorized processes for the associated APP ID)).

In one embodiment, the integrated security solution facilitates fine-grained policy enforcement and/or outbound/inbound lateral traffic punting based upon process risk in an enterprise network and on EP devices associated with the enterprise network. For example, the disclosed platform can provide for fine-grained policy enforcement and/or outbound/inbound lateral traffic punting based upon process risk that can extend across the enterprise network, including both internal as well as mobile users and various other EP devices (e.g., authenticating/accessing the enterprise network can result/require that an EP agent be deployed to the mobile device using well-known techniques).

As further described below, the disclosed techniques can prevent/block various security threats (e.g., insider threats and/or malware attempting lateral movement in the enterprise network). The disclosed techniques can also protect the enterprise network and associated endpoints from various zero day and unknown malware threats.

Further, the integrated security solution is also in communication with the security service that provides integrated security intelligence to facilitate fine-grained policy enforcement and/or outbound/inbound lateral traffic punting based upon process risk across the enterprise network, including network devices and EP devices associated with the enterprise network. As such, the disclosed techniques facilitate fine-grained policy enforcement and/or outbound/inbound lateral traffic punting based upon process risk across all threat vectors everywhere across the enterprise network.

Figure 7:
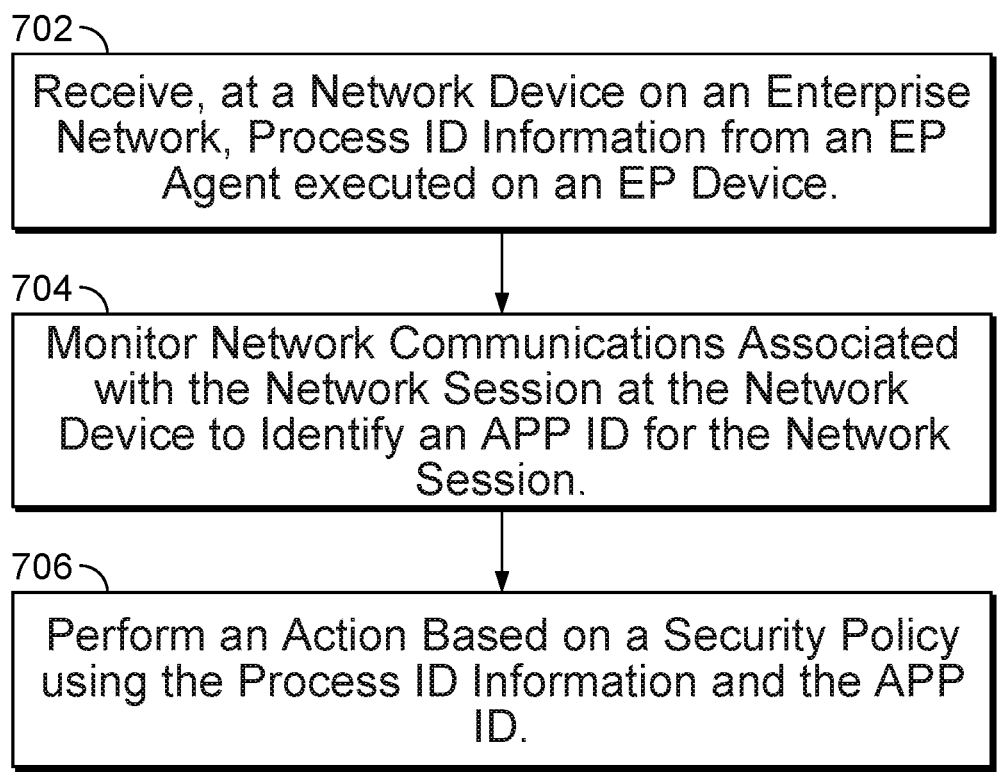
FIG. 7 is a flow chart for performing fine-grained policy enforcement in accordance with some embodiments.

Processes for Fine-Grained Firewall Policy Enforcement Using Session APP ID and Endpoint Process ID Correlation FIG. 7 is a flow chart for performing fine-grained policy enforcement in accordance with some embodiments. In various embodiments, the process shown in FIG. 7 is performed by the network device/firewall as similarly described above with respect to FIGS. 1-6.

At 702, process identification (ID) information from an EP agent executed on an EP device is received at a network device on an enterprise network. For example, the process identification information identifies a process that is initiating a network session from the EP device on the enterprise network.

At 704, network communications associated with the network session are monitored at the network device to identify an application identification (APP ID) for the network session. For example, network traffic can be monitored at network devices/firewalls to determine the APP ID (e.g., and/or other information, such as user ID, content ID, URL, and/or other information), such as network device 302/firewall 312 as shown in FIG. 3 and network device 602/firewall 604 as shown in FIG. 6.

At 706, an action is performed based on a security policy using the process ID information and the APP ID. For example, responsive action(s) can include one or more of the following: throttle the network session, block the network session, send a request to the EP agent to kill the process executing on the EP device, generate an alert, log the network session, send the process ID information and the APP ID to the EP agent, and send the process ID information and the APP ID to a security service to request a verdict based on the process ID information and the APP ID.

In one embodiment, the network device/firewall is in communication with a security service and can assist in performing the above-described techniques for fine-grained policy enforcement using shared intelligence from one or more network devices/firewalls, EP agents, such as to collect/receive correlated process ID information and APP ID information and to perform malware analysis on untrusted/unknown process IDs (e.g., samples associated with such process IDs).

Figure 8:
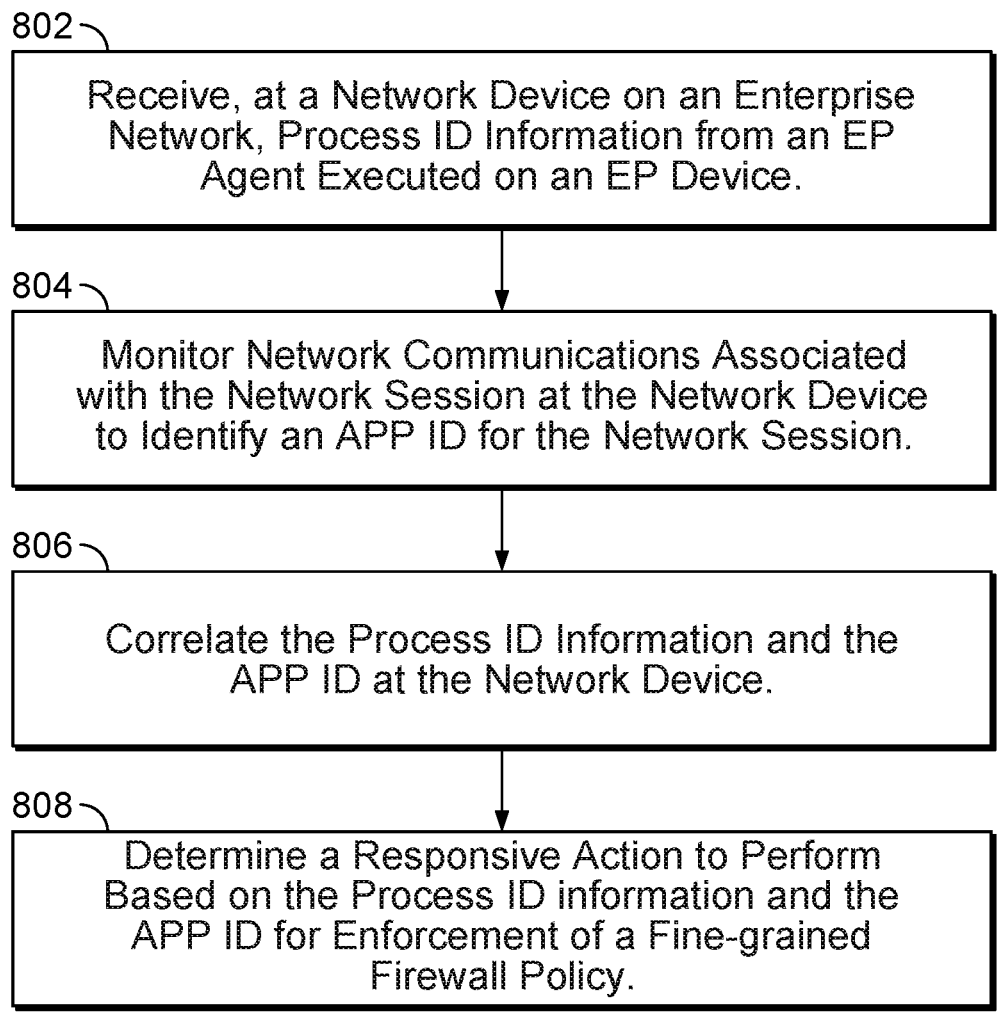
FIG. 8 is another flow chart for performing fine-grained policy enforcement in accordance with some embodiments.

FIG. 8 is another flow chart for performing fine-grained policy enforcement in accordance with some embodiments. In various embodiments, the process shown in FIG. 8 is performed by the network device/firewall as similarly described above with respect to FIGS. 1-6.

At 802, process identification (ID) information from an EP agent executed on an EP device is received at a network device on an enterprise network. For example, the process identification information identifies a process that is initiating a network session from the EP device on the enterprise network.

At 804, network communications associated with the network session are monitored at the network device to identify an application identification (APP ID) for the network session. For example, network traffic can be monitored at network devices/firewalls to determine the APP ID (e.g., and/or other information, such as user ID, content ID, URL, and/or other information), such as network device 302/firewall 312 as shown in FIG. 3 and network device 602/firewall 604 as shown in FIG. 6.

At 806, correlating the process ID information and the APP ID at the network device is performed. For example, the network device can cache/store a table of the correlated process ID information and the APP ID (e.g., and/or other information, such as user ID, content ID, and/or URL, can also be included in the table).

At 808, determining a responsive action to perform based on the process ID information and the APP ID for enforcement of the fine-grained firewall policy is performed. For example, responsive action(s) can include one or more of the following that can be performed in response to detecting a suspicious activity based on the correlated process ID information and the APP ID: throttle the network session, block the network session, send a request to the EP agent to kill the process executing on the EP device, generate an alert, log the network session, send the process ID information and the APP ID to the EP agent, and send the process ID information and the APP ID to a security service to request a verdict based on the process ID information and the APP ID.

Processes for Outbound/Inbound Lateral Traffic Punting Based Upon Process Risk

Figure 9:
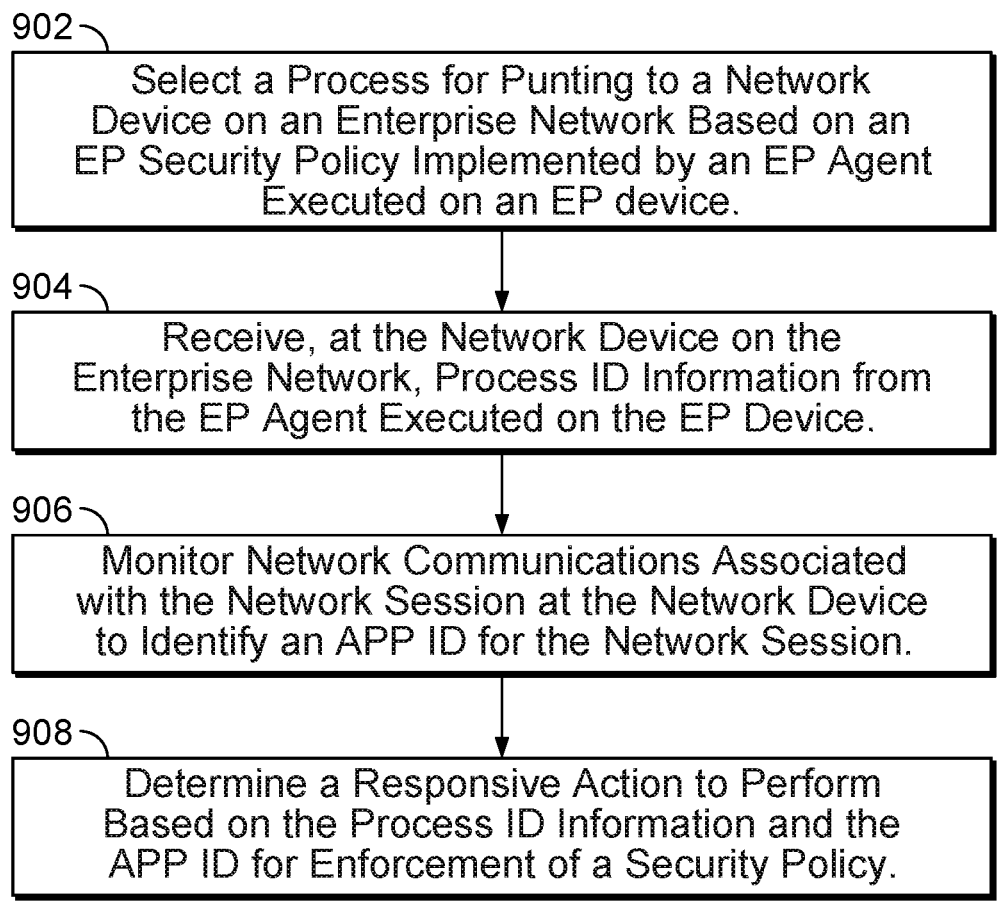
FIG. 9 is a flow chart for performing outbound/inbound lateral traffic punting based upon process risk in accordance with some embodiments.

FIG. 9 is a flow chart for performing outbound/inbound lateral traffic punting based upon process risk in accordance with some embodiments. In various embodiments, the process shown in FIG. 9 is performed by the network device/firewall as similarly described above with respect to FIGS. 1-6.

At 902, a process for punting to a network device on an enterprise network is selected based on an EP security policy implemented by an EP agent executed on an EP device.

At 904, process identification (ID) information from the EP agent executed on the EP device is received at the network device on the enterprise network. For example, the process identification information identifies a process that is initiating a network session from the EP device on the enterprise network, in which the EP agent selected the network session for punting to the network device for inspection.

At 906, network communications associated with the network session are monitored at the network device to identify an application identification (APP ID) for the network session. For example, network traffic can be monitored at network devices/firewalls to determine the APP ID (e.g., and/or other information, such as user ID, content ID, URL, and/or other information), such as network device 302/firewall 312 as shown in FIG. 3 and network device 602/firewall 604 as shown in FIG. 6.

At 908, determining a responsive action is performed based on the process ID information and the APP ID for enforcement of a security policy (e.g., a fine-grained firewall policy). For example, responsive action(s) can include one or more of the following: throttle the network session, block the network session, send a request to the EP agent to kill the process executing on the EP device, generate an alert, log the network session, send the process ID information and the APP ID to the EP agent, and send the process ID information and the APP ID to a security service to request a verdict based on the process ID information and the APP ID.

Figure 10:
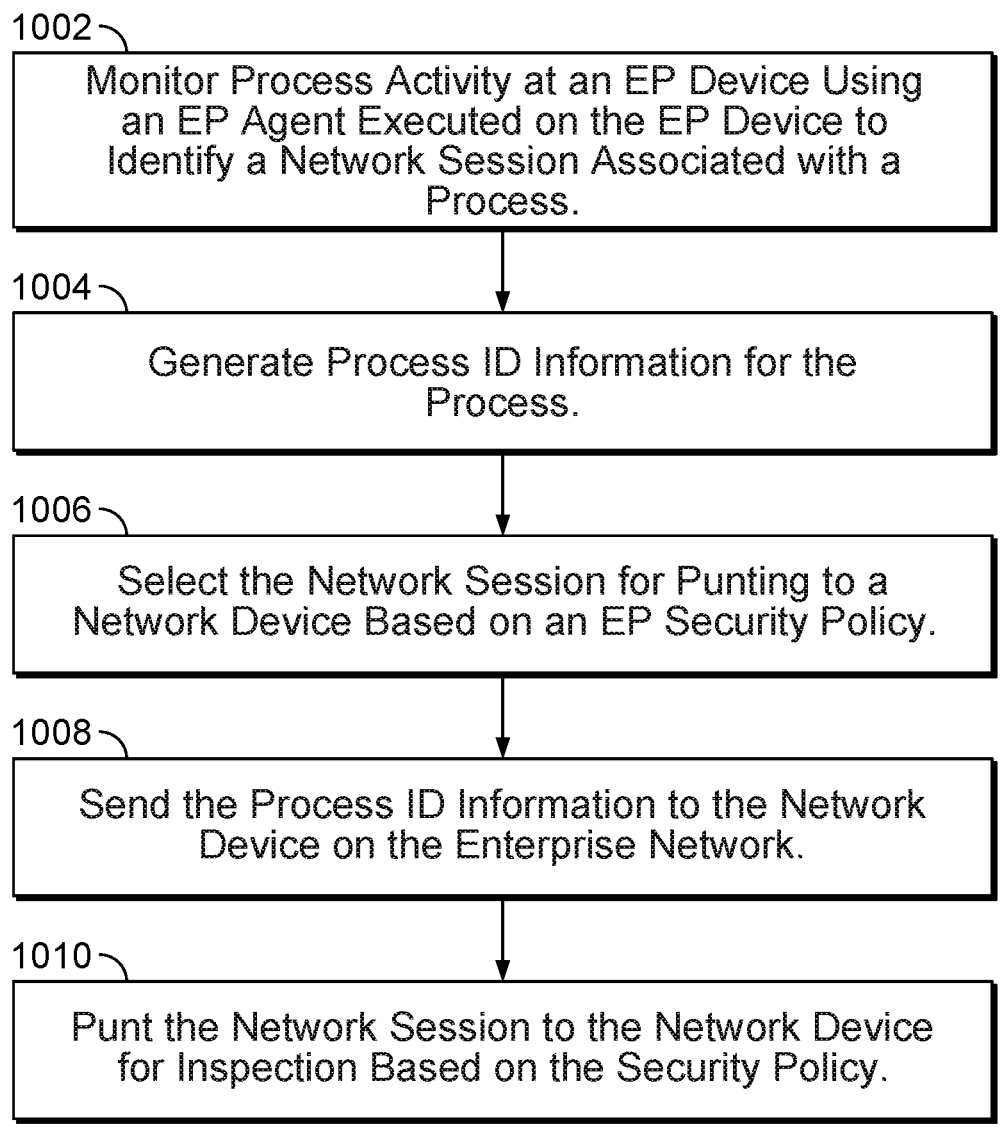
FIG. 10 is another flow chart for performing outbound/inbound lateral traffic punting based upon process risk in accordance with some embodiments.

FIG. 10 is another flow chart for performing outbound/inbound lateral traffic punting based upon process risk in accordance with some embodiments. In various embodiments, the process shown in FIG. 10 is performed by the network device/firewall as similarly described above with respect to FIGS. 1-6.

At 1002, process activity is monitored at an EP device using an EP agent executed on the EP device to identify a network session associated with a process. For example, the network session can correspond to lateral movement in an enterprise network, which may otherwise evade firewall/security inspection if not punted to a network device for inspection.

At 1004, generating process identification (ID) information is performed. For example, the process identification information (e.g., including a process digest and other information, such as source/destination IP address, source/destination port number, and protocol) identifies the process that is associated with the network session.

At 1006, selecting the network session for punting to a network device on the enterprise network for inspection based on a security policy implemented by the network device is performed. For example, an EP security policy implemented by the EP agent executed on the EP device can be applied to select network traffic sessions associated with a potentially risky/malicious process (e.g., a network session associated with an untrusted/unknown process ID) for inbound/outbound punting for inspection using a firewall, which is more efficient and effective as it is generally too computationally expensive to inspect all lateral movement within a network.

At 1008, sending the process ID information to the network device on the enterprise network is performed. For example, the network device determines an action to perform based on the security policy using the process ID information and an APP ID determined at the network device for the network session.

At 1010, punting the network session to the network device for inspection based on the security policy is performed. For example, the selected network session can be routed over a pre-established tunnel (e.g., a Virtual Private Network (VPN) tunnel) to the network device (e.g., implementing a firewall that enforces a fine-grained security policy).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor of a network device on an enterprise network configured to:
  receive process identification (ID) information from an endpoint (EP) agent executed on an EP device, wherein the process identification information identifies a process that is initiating a network session from the EP device on the enterprise network;
  monitor network communications associated with the network session at the network device to identify an application identification (APP ID) for the network session; and
  perform an action based on a security policy using the process ID information and the APP ID, comprising to:
   perform one or more of the following:
   A) determine whether the APP ID is unknown/untrusted; and
    in response to a determination that the APP ID is unknown/untrusted:
     perform a first responsive action until the APP ID is determined, wherein the first responsive action corresponds to block/drop, hold/quarantine, log, or throttle the monitored network communications; and after the APP ID is determined, perform a second response action, wherein the second response action corresponds to allow, block/drop, hold/quarantine, log, or throttle, the first responsive action being different from the second responsive action; and/or B) determine whether the monitored network communications are associated with a known APP ID; and in response to a determination that the monitored network communications are associated with a known APP ID:

determine whether the monitored network communications are associated with a process ID not known to be associated with the known APP ID; and in response to a determination that the monitored network communications are associated with a process ID not known to be associated with the known APP ID, block the network communications, wherein an application associated with the process ID is related to web browsing, and wherein a file associated with the known APP ID is not associated with web browsing; and a memory coupled to the processor and configured to provide the processor with instructions.

2. The system recited in claim 1, wherein the network session and/or the process is determined to be suspicious based on the security policy and/or based on an EP security policy implemented by the EP agent.

3. The system recited in claim 1, wherein the process ID information is determined to be an unknown or untrusted process, and wherein the network session and/or the process is determined to be suspicious based on the security policy and/or based on an EP security policy implemented by the EP agent.

4. The system recited in claim 1, wherein the process ID information is determined to be a known process that is not authorized for performing network sessions on the enterprise network that correspond to the APP ID based on the security policy, and wherein the network session and/or the process is determined to be suspicious based on the security policy.

5. The system recited in claim 1, wherein the processor is further configured to:
correlate the process ID information and the APP ID at the network device.

6. The system recited in claim 1, wherein the processor is further configured to:
correlate the process ID information and the APP ID at the network device; and
detect a suspicious activity based on the correlated process ID information and the APP ID.

7. The system recited in claim 1, wherein the security policy is a fine-grained firewall policy, and wherein the processor is further configured to:
correlate the process ID information and the APP ID at the network device; and
determine a responsive action to perform based on the process ID information and the APP ID for enforcement of the fine-grained firewall policy.

8. The system recited in claim 1, wherein to perform the action based on the security policy using the process ID information and the APP ID comprises one or more of the following:
throttle the network session, block the network session, send a request to the EP agent to kill the process executing on the EP device, generate an alert, log the network session, send the process ID information and the APP ID to the EP agent, and send the process ID information and the APP ID to a security service to request a verdict based on the process ID information and the APP ID.

9. The system recited in claim 1, wherein the processor is further configured to:
establish a secure communication channel with the EP device for receiving the process ID information and sending a responsive action to perform based on the security policy using the process ID information and the APP ID, wherein the responsive action includes killing the process executing on the EP device and/or uninstalling an executable associated with the process.

10. The system recited in claim 1, wherein the performing of the action based on the security policy using the process ID information and the APP ID comprises to:
perform the following:
A) determine whether the APP ID is unknown/untrusted; and
in response to a determination that the APP ID is unknown/untrusted:
perform a first responsive action until the APP ID is determined, wherein the first responsive action corresponds to block/drop, hold/quarantine, log, or throttle the monitored network communications; and
after the APP ID is determined, perform a second response action, wherein the second response action corresponds to allow, block/drop, hold/quarantine, log, or throttle, the first responsive action being different from the second responsive action; and B) determine whether the monitored network communications are associated with a known APP ID; and
in response to a determination that the monitored network communications are associated with a known APP ID:
determine whether the monitored network communications are associated with a process ID not known to be associated with the known APP ID; and
in response to a determination that the monitored network communications are associated with a process ID not known to be associated with the known APP ID, block the network communications, wherein an application associated with the process ID is related to web browsing, and wherein a file associated with the known APP ID is not associated with web browsing.

11. A method, comprising:
receiving, at a network device on an enterprise network, process identification (ID) information from an endpoint (EP) agent executed on an EP device, wherein the process identification information identifies a process that is initiating a network session from the EP device on the enterprise network;
monitoring network communications associated with the network session at the network device to identify an application identification (APP ID) for the network session; and
performing an action based on a security policy using the process ID information and the APP ID, comprising:
performing one or more of the following:
A) determining whether the APP ID is unknown/untrusted; and in response to a determination that the APP ID is unknown/untrusted:
  performing a first responsive action until the APP ID is determined, wherein the first responsive action corresponds to block/drop, hold/quarantine, log, or throttle the monitored network communications; and
  after the APP ID is determined, performing a second response action, wherein the second response action corresponds to allow, block/drop, hold/quarantine, log, or throttle, the first responsive action being different from the second responsive action; and/or
B) determining whether the monitored network communications are associated with a known APP ID; and
in response to a determination that the monitored network communications are associated with a known APP ID:
  determining whether the monitored network communications are associated with a process ID not known to be associated with the known APP ID; and
  in response to a determination that the monitored network communications are associated with a process ID not known to be associated with the known APP ID blocking the network communications, wherein an application associated with the process ID is related to web browsing, and wherein a file associated with the known APP ID is not associated with web browsing.

12. The method of claim 11, wherein the network session and/or the process is determined to be suspicious based on the security policy and/or based on an EP security policy implemented by the EP agent.

13. The method of claim 11, wherein the process ID information is determined to be an unknown or untrusted process, and wherein the network session and/or the process is determined to be suspicious based on the security policy and/or based on an EP security policy implemented by the EP agent.

14. The method of claim 11, wherein the process ID information is determined to be a known process that is not authorized for performing network sessions on the enterprise network that correspond to the APP ID based on the security policy, and wherein the network session and/or the process is determined to be suspicious based on the security policy.

15. A computer program product, the computer program product being embodied in a tangible computer readable storage medium and comprising computer instructions for:
  receiving, at a network device on an enterprise network, process identification (ID) information from an endpoint (EP) agent executed on an EP device, wherein the process identification information identifies a process that is initiating a network session from the EP device on the enterprise network;
  monitoring network communications associated with the network session at the network device to identify an application identification (APP ID) for the network session; and
  performing an action based on a security policy using the process ID information and the APP ID, comprising:
    performing one or more of the following:
    A) determining whether the APP ID is unknown/untrusted; and
    in response to a determination that the APP ID is unknown/untrusted:
      performing a first responsive action until the APP ID is determined, wherein the first responsive action corresponds to block/drop, hold/quarantine, log, or throttle the monitored network communications; and
      after the APP ID is determined, perform a second response action, wherein the second response action corresponds to allow, block/drop, hold/quarantine, log, or throttle, the first responsive action being different from the second responsive action; and/or
    B) determining whether the monitored network communications are associated with a known APP ID; and
    in response to a determination that the monitored network communications are associated with a known APP ID:
      determine whether the monitored network communications are associated with a process ID not known to be associated with the known APP ID; and
      in response to a determination that the monitored network communications are associated with a process ID not known to be associated with the known APP ID blocking the network communications, wherein an application associated with the process ID is related to web browsing, and wherein a file associated with the known APP ID is not associated with web browsing.

16. The computer program product recited in claim 15, wherein the network session and/or the process is determined to be suspicious based on the security policy and/or based on an EP security policy implemented by the EP agent.

17. The computer program product recited in claim 15, wherein the process ID information is determined to be an unknown or untrusted process, and wherein the network session and/or the process is determined to be suspicious based on the security policy and/or based on an EP security policy implemented by the EP agent.

18. The computer program product recited in claim 15, wherein the process ID information is determined to be a known process that is not authorized for performing network sessions on the enterprise network that correspond to the APP ID based on the security policy, and wherein the network session and/or the process is determined to be suspicious based on the security policy.

* * * * *